United States Patent
Phillips et al.

(10) Patent No.: US 10,977,602 B2
(45) Date of Patent: *Apr. 13, 2021

(54) INTELLIGENCE PLATFORM FOR AUTOMATED RETRIEVAL OR PROTECTION OF A PACKAGE OR A PERSON BY AN UNMANNED VEHICLE (UV)

(71) Applicant: Capital One Services, LLC, McLean, VA (US)

(72) Inventors: Jeremy Phillips, Brooklyn, NY (US); Kevin Park, Little Neck, NY (US); Shane Blackman, New York, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/554,840

(22) Filed: Aug. 29, 2019

(65) Prior Publication Data

US 2020/0034787 A1 Jan. 30, 2020

Related U.S. Application Data

(63) Continuation of application No. 16/045,172, filed on Jul. 25, 2018, now Pat. No. 10,402,774.

(51) Int. Cl.
*G06Q 10/08* (2012.01)
*G06N 20/00* (2019.01)

(52) U.S. Cl.
CPC ......... *G06Q 10/0833* (2013.01); *G06N 20/00* (2019.01)

(58) Field of Classification Search
CPC .......................... G06Q 10/0833; G06N 20/00
See application file for complete search history.

(56) References Cited

U.S. PATENT DOCUMENTS 6,974,077 B1 12/2005 Beyder et al.
9,387,928 B1 7/2016 Gentry et al.
(Continued)

FOREIGN PATENT DOCUMENTS

KR 101653125 B1 9/2016

OTHER PUBLICATIONS

Kesteloo, H, "Amazon Receives Patent for Delivery Drone that Reacts to Screaming Voices and Flailing Arms," Oct. 25, 2018, 7 pages. Retrieved from Internet:[URL:https://dronedj.com/2018/03/26/amazon-receives-patent-for-delivery-drone-that-reacts-to-screaming-voices-and-flailing-arms/].

(Continued)

*Primary Examiner* — Hussein Elchanti
(74) *Attorney, Agent, or Firm* — Harrity & Harrity, LLP

(57) ABSTRACT

An intelligence platform determines that a package was delivered to a location, and receives real-time information associated with the package or location. The real-time information includes sensor data received from one or more sensor devices disposed proximate to the package, or third party data received from one or more third party devices associated with a geographic region that includes the location to which the package was delivered. The intelligence platform determines, using a machine learning model, a score for the package based on the real-time information, where the score predicts a measure of vulnerability of the package, and determines whether to retrieve or protect the package based on the score. The intelligence platform selects an unmanned vehicle (UV) to retrieve or protect the package based on vehicular data, and transmits instructions to the UV to cause the UV to navigate to the package and retrieve or protect the package.

20 Claims, 11 Drawing Sheets

(56) References Cited

U.S. PATENT DOCUMENTS

| | | | |
|---|---|---|---|
| 9,459,620 | B1 | 10/2016 | Schaffalitzky et al. |
| 10,248,120 | B1 | 4/2019 | Siegel et al. |
| 10,402,774 | B1 * | 9/2019 | Phillips .............. G06Q 10/0833 |
| 2007/0150375 | A1 | 6/2007 | Yang |
| 2016/0203649 | A1 | 7/2016 | Berkobin et al. |
| 2016/0328979 | A1 | 11/2016 | Postrel et al. |
| 2017/0023947 | A1 | 1/2017 | McMillion |
| 2017/0098191 | A1 | 4/2017 | Lee et al. |
| 2017/0124789 | A1 | 5/2017 | Rephlo et al. |
| 2017/0255986 | A1 | 9/2017 | Herbst et al. |
| 2017/0286892 | A1 | 10/2017 | Studnicka |
| 2019/0049988 | A1 | 2/2019 | Meij |

OTHER PUBLICATIONS

Premiumlogics, "The Future of Drone Delivery Hinges on Predicting the Weather Block by Block," Jul. 25, 2018, 3 pages. Retrieved from Internet:[URL:https://www.premiumlogics.com/the-future-of-drone-delivery-hinges-on-predicting-the-weatherblock-by-block/].

* cited by examiner

INTELLIGENCE PLATFORM FOR AUTOMATED RETRIEVAL OR PROTECTION OF A PACKAGE OR A PERSON BY AN UNMANNED VEHICLE (UV)

RELATED APPLICATION

This application is a continuation of U.S. patent application Ser. No. 16/045,172, filed Jul. 25, 2018 (now U.S. Pat. No. 10,402,774), which is incorporated herein by reference.

BACKGROUND

Unmanned Vehicles (UVs) are rapidly being adopted in many industries. Among the various applications being implemented by UVs, delivery of goods and products is perhaps the most well-known. Many companies are exploring the potential of UV delivery for food, books, newspapers, and retail goods to consumers.

SUMMARY

According to some implementations, a method may include determining, by a computing resource of a cloud computing environment, that a package was delivered to a location, and receiving, by a computing resource of the cloud computing environment, real-time information associated with the package or the location to which the package was delivered, wherein the real-time information includes sensor data received from one or more sensor devices disposed proximate to the package, and third party data received from one or more third party devices associated with a geographic region that includes the location to which the package was delivered. The method may include determining, by a computing resource of the cloud computing environment and using a first machine learning model, a first score for the package based on the real-time information, wherein the first score predicts a measure of vulnerability of the package, and determining, by a computing resource of the cloud computing environment, whether to retrieve or protect the package based on the first score for the package. The method may include receiving, by a computing resource of the cloud computing environment, vehicular data associated with a plurality of unmanned vehicles (UVs) capable of retrieving or protecting the package, and determining, by a computing resource of the cloud computing environment and using a second machine learning model, a second score for one or more of the plurality of UVs, wherein the second score predicts a measure of confidence that a first UV, of the one or more of the plurality of UVs, is capable of retrieving or protecting the package. The method may include selecting, by a computing resource of the cloud computing environment, the first UV, of the one or more of the plurality of UVs, to retrieve or protect the package based on the second score. The method may include determining, by a computing resource of the cloud computing environment, instructions for causing the first UV to navigate to the package and retrieve or protect the package, and transmitting, by a computing resource, the instructions to the first UV to cause the first UV to navigate to the package and retrieve or protect the package.

According to some implementations, a device may include one or more memories, and one or more processors, communicatively coupled to the one or more memories, to determine that a package was delivered to a location, and to receive real-time information associated with the package or the location to which the package was delivered, wherein the real-time information includes sensor data received from one or more sensor devices disposed proximate to the package, or third party data received from one or more third party devices associated with a geographic region that includes the location to which the package was delivered. The one or more processors may determine, using a machine learning model, a score for the package based on the real-time information, wherein the score predicts a measure of vulnerability of the package, and may determine whether to retrieve or protect the package based on the score for the package. The one or more processors may receive vehicular data associated with a plurality of UVs capable of retrieving or protecting the package, and may select a particular UV, of the one or more of the plurality of UVs, to retrieve or protect the package based on the vehicular data. The one or more processors may determine instructions for causing the particular UV to navigate to the package and retrieve or protect the package, and may transmit the instructions to the particular UV to cause the particular UV to navigate to the package and retrieve or protect the package.

According to some implementations, a non-transitory computer-readable medium may store instructions that include one or more instructions that, when executed by one or more processors of a device, cause the one or more processors to determine a location of a package or a person, to receive real-time information associated with the location, the package, or the person, wherein the real-time information includes sensor data received from one or more sensor devices disposed proximate to the package or the person, or third party data received from one or more third party devices associated with a geographic region that includes the location of the package or the person, and to retrieve or protect the package or the person based on the real-time information. The one or more instructions may cause the one or more processors to receive vehicular data associated with a plurality of UVs capable of retrieving or protecting the package or the person, to determine, using a machine learning model, a score for one or more of the plurality of UVs, wherein the score predicts a measure of confidence that a particular UV, of the one or more of the plurality of UVs, is capable of retrieving or protecting the package or the person, and to select the particular UV, of the one or more of the plurality of UVs, to retrieve or protect the package or the person based on the score. The one or more instructions may cause the one or more processors to determine instructions for causing the particular UV to navigate to the package or the person and retrieve or protect the package or the person, and to transmit the instructions to the particular UV to cause the particular UV to navigate to the package or the person and retrieve or protect the package or the person.

DETAILED DESCRIPTION

Figure 1A:
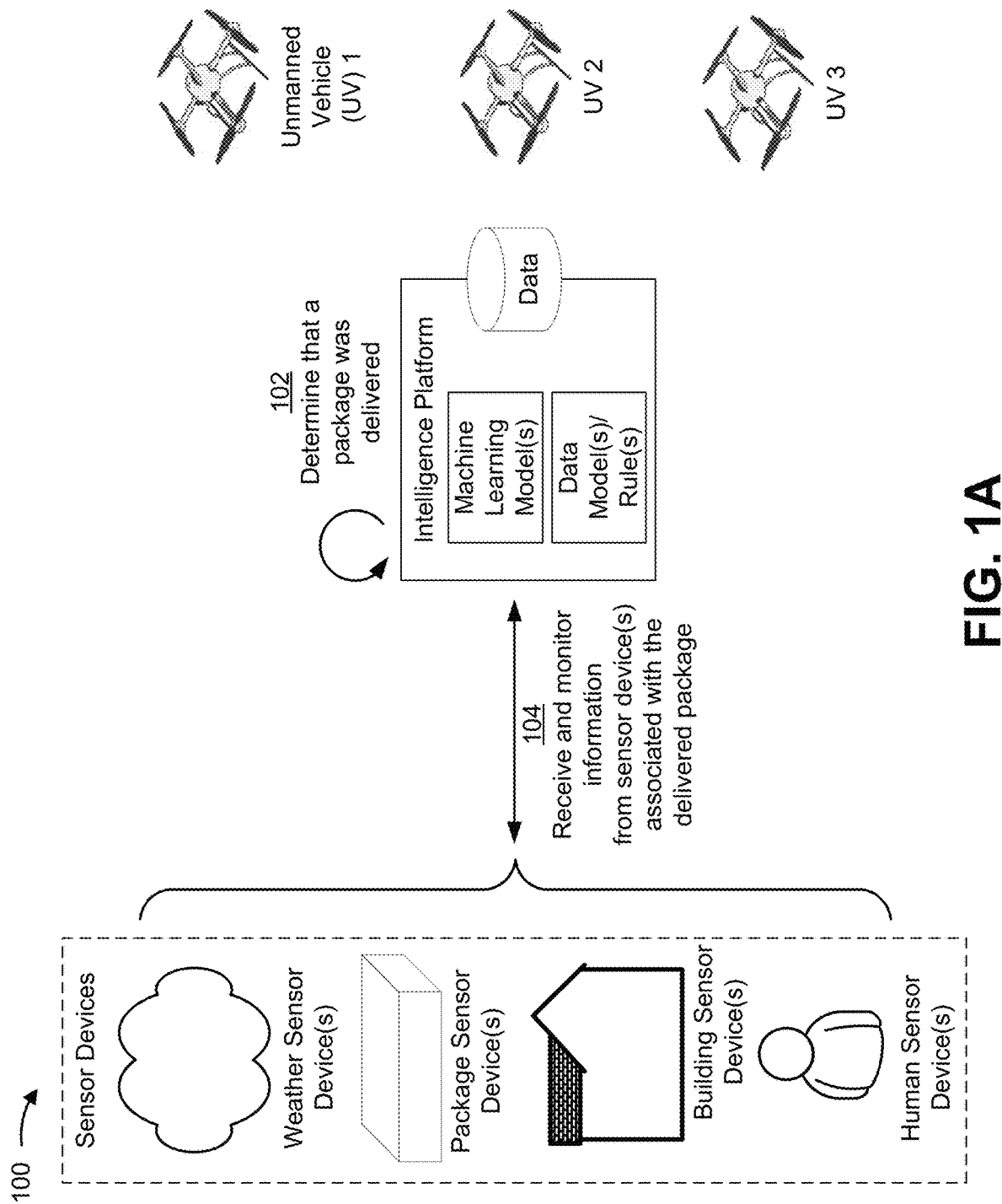
FIGS. 1A-1F are diagrams of an example implementation described herein.

The following detailed description of example implementations refers to the accompanying drawings. The same reference numbers in different drawings may identify the same or similar elements.

Packages are delivered to hundreds, thousands, or more recipients, per day, within a given geographic region. Oftentimes, a delivered package is left unattended at a delivery location until the intended recipient, or other, authorized recipient, becomes available to take possession of the package. Too often, packages are stolen from the delivery locations. Additionally, conditions surrounding the delivered packages are subject to change. For example, a storm may materialize, a fire may start, a burglary may occur in close proximity to a delivered package, any of which may cause a sender or a recipient of the package concern over the delivered package's vulnerability to being lost, stolen, or damaged. Such concerns may escalate when the delivered package contains sensitive information, such as personal or financial information.

Some implementations described herein provide an intelligence platform that is capable of receiving real-time information associated with a package or a location to which the package was delivered, and determine whether to retrieve or protect the package based on the real-time information. In this way, the intelligence platform improves the security associated with leaving packages unattended after delivery.

Some implementations described herein provide an intelligence platform that is capable of receiving, processing, and/or analyzing the real-time information associated with hundreds, thousands, or more packages delivered to locations within a given geographic region, and determine, using data models and/or machine learning techniques, whether any one of the hundreds, thousands, etc., packages are vulnerable to being lost, stolen, or damaged. The intelligence platform may intelligently select and instruct an unmanned vehicle (UV) from a pool of UVs to retrieve or protect the package. In this way, computing resources that would otherwise be devoted to tracking the package may be reduced or obviated. Similarly, computing resources that would otherwise be devoted to duplicating (i.e., re-doing) the package order and delivery schedule may be reduced or obviated. The intelligent package retrieval and/or protection methods described herein may prevent fraud, waste, and/or millions of dollars in losses of consumer products per year.

Some implementations described herein provide an intelligence platform that is capable of receiving real-time information associated with a person or a location associated with the person, and determine whether to retrieve or protect the person based on the real-time information. In this way, resources that may otherwise be devoted to assisting and/or rescuing the person may be reduced or obviated.

FIGS. 1A-1F are diagrams of an example implementation described herein. As shown in FIGS. 1A-1F, example implementation 100 may include an intelligence platform that interacts with one or more sensor devices, with one or more third party devices, and/or with one or more UVs.

As shown in FIG. 1A, and by reference number 102, the intelligence platform may determine that a package was delivered. The package may include or contain at least one good (e.g., a consumer product, a manufactured product, etc.), a perishable good (e.g., a refrigerated food, beverage, or medicine, etc.), a living good (e.g., a live plant, a live animal, etc.), food, clothing (e.g., packaged clothing, shoes, dry cleaned clothing, etc.), and/or the like. Additionally, or alternatively, the package may include or contain sensitive information and/or a sensitive good, such as a credit card, a debit card, cash, a check, a stock or bond certificate, a cashier's check, and/or the like. The package may be left unattended at a delivery location specified by a package sender or recipient.

In some implementations, a delivery service (e.g., FedEx®, UPS®, etc.), using a computing device (e.g., a computer, tablet, laptop, kiosk, etc.), may notify the intelligence platform that the package was delivered. For example, the delivery service may input, via a scanning device, a package identifier (e.g., a barcode, label, RFID tag, etc.), associated with a package envelope or container, to a computing device and transmit the package identifier to the intelligence platform to notify the intelligence platform that a package corresponding to the package identifier has been delivered. In some implementations, the package sender, using a computing device, may notify the intelligence platform that the package was delivered. For example, the sender may receive an electronic confirmation that the package has been delivered and electronically send, transmit, or log the electronic confirmation associated with the delivery of the package to the intelligence platform to notify the intelligence platform that the package has been delivered.

In some implementations, the package recipient or user, using a user device (e.g., a smartphone, a computer, a laptop, a tablet, etc.), may receive confirmation that the package was delivered and notify the intelligence platform that the package was delivered. In some implementations, the intelligence platform may subscribe to receive delivery data from one or more delivery services, package senders, or package recipients. The data may be exported or streamed to the intelligence platform in real-time, or near real-time, so that the intelligence platform may begin receiving, sending, processing, and/or otherwise monitoring information associated with the package.

As further shown in FIG. 1A, and by reference number 104, the intelligence platform may receive and monitor information from one or more sensor devices associated with the delivered package. In some implementations, the intelligence platform may utilize such information in determining whether to retrieve or protect a package.

In some implementations, the sensor devices may include, for example, devices which provide an output (e.g., a signal) to the intelligence platform in response to detecting a change in a characteristic or input. Example sensor devices may include, without limitation, temperature sensors, proximity sensors, accelerometers, infrared (IR) sensors, pressure sensors, light sensors, ultrasonic sensors, smoke detecting sensors, gas detecting sensors, chemical detecting sensors, color detecting sensors, humidity sensors, vibration sensors, and/or the like. Such sensor devices may be active (i.e., require a power source) or passive (i.e., do not require a power source). Such sensor devices may include photoelectric components, thermoelectric components, electrochemical components, electromagnetic components, optical components, thermal components, electrical components, magnetic components, capacitors, resistors, magnets, and/or the like for detecting electrical, mechanical, biological, optical, thermal, and/or chemical changes associated with the package or the location to which the package was delivered.

In some implementations, the sensor devices may be disposed in a geographic region corresponding to the location where the package was delivered. In some implementations, the sensor devices may be disposed on, over, or inside of the package, or within about a five-foot (ft.) radius of the package. In some instances, the sensor devices may be located distances of about 6 ft. or more from the package, distances of about 10 ft. or more from the package, distances of about 100 ft. or more from the package, distances of about 500 ft. or more from the package, or distances of greater than 1000 ft. from the package. In some instances, the sensor devices may be disposed at distances of less than 5 miles from the package, distances of less than 2 miles from the package, distances of less than 1 mile from the package, distances of less than 0.5 mile from the package, distances of less than 0.25 mile from the package, or distances of less than 0.1 mile from the package. Additionally, or alternatively, the one or more sensor devices described herein may be disposed directly on, over, or inside of the package (e.g., on or over one or more inner or outer walls of the package).

As FIG. 1A illustrates, example sensor devices may include weather sensor devices, package sensor devices, building sensor devices, and/or human sensor devices that detect conditions and/or changes associated with the conditions inside of the package, conditions outside of the package, and/or changes associated with the location of the package. Other types of sensor devices may be contemplated.

In some implementations, the weather sensor devices may be positioned on or over one or more surfaces of the package or surfaces disposed proximate to the package, as described herein, for detecting the weather and/or weather conditions. For example, the weather sensor devices may include temperature sensors, humidity sensors, light sensors, pressure sensors, noise sensors, and/or the like. The weather sensor devices may be disposed on or over one or more surfaces of the package and/or on or over surfaces (e.g., of a building, a structure, a tree, a bridge, a roadway, a cellular tower, etc.) disposed proximate to the package for detecting aspects relating to a temperature outside of the package, a moisture content of air outside of the package, an amount of light (e.g., which may be indicative of a storm) outside of the package, an atmospheric pressure, and/or a noise or noise level (e.g., which may be indicative of thunder, a storm, a tornado, a hurricane, etc.) associated with the package or the location where the package was delivered. In some implementations, the weather sensor devices may be positioned or provided by a provider of the intelligence platform, the package sender, the package recipient, the package delivery service provider, and/or a weather reporting service to which the intelligence platform may subscribe to receive data.

Still referring to FIG. 1A, and in some implementations, one or more package sensor devices may be positioned on or over one or more surfaces of the package. The surfaces may include outer surfaces forming an outside of the package or inner surfaces forming an inside of the package. For example, the package sensor devices may include temperature sensors, oxygen sensors, moisture sensors, proximity sensors, positioning sensors, and/or the like, which may be disposed on or over one the or more surfaces of the package for detecting conditions associated with and/or relating to the package.

As an example, the package sensor devices may include one or more temperature sensors for detecting a temperature inside or outside of the package, which may be used to monitor and/or determine the health, safety, and/or vulnerability of perishable items (e.g., food, medicine, etc.) contained by the package, animals partially contained by the package, plants contained by the package, and/or the like. Similarly, the package sensor devices may include one or more oxygen sensors disposed inside of the package for detecting an oxygen level inside of the package, which may be used to monitor and/or determine the health, safety, and/or vulnerability of an animal partially contained by the package. Similarly, the package sensor devices may include one or more moisture sensors disposed inside of the package for detecting a humidity or moisture level inside of the package, which may be used to monitor and/or determine the safety, viability, and/or vulnerability of electrical components (e.g., phones, computers, electrical devices or equipment, and/or the like) contained by the package. The package sensor devices may be positioned or provided by the provider of the intelligence platform, the package sender, the package recipient, and/or the package delivery service provider.

Still referring to FIG. 1A, and in some implementations, the building sensor devices may be positioned on or over one or more surfaces of a building associated with the package. The package may be disposed proximate to the building, and the building may include a building where the package was delivered. The building sensor devices may be disposed on or over surfaces of one or more structures forming the building. For example, the building sensor devices may include one or more image capture devices (e.g., for capturing images, videos, etc.), smoke alarm sensors, burglar alarm sensors, chemical detecting sensors, gas detecting sensors, and/or the like, which may be disposed on or over one or more surfaces of the building for detecting aspects relating to the building.

As an example, the building sensor devices may include one or more cameras disposed on, over, or within the building for capturing images associated with the building. The intelligence platform may use the images and/or data associated with the images to monitor the safety or vulnerability of the package. The intelligence platform may subscribe to receive the images and/or the data associated with the images from a camera provider (e.g., the recipient, building manager, etc.). In some implementations, the camera provider may opt-in to sharing the images and/or the data associated with the images with the intelligence platform. Similarly, one or more smoke alarm sensors may be disposed on, over, or within the building to detect smoke and/or fire associated with the building to where the package was delivered, which may be used to monitor the safety or vulnerability of the package. Similarly, burglar alarm sensors may be disposed inside of the building for detecting whether a building was breached by an intruder, which may be used to monitor and/or determine the safety or vulnerability of the package. Similarly, chemical or gas detecting sensors may be disposed on, over, or within the building to detect chemicals or gases associated with the building to where the package was delivered, which may be used to determine the safety or vulnerability of the package. The building sensor devices may be positioned and/or provided by a building owner, the building manager, and/or the package recipient, any of which may opt-in to sharing the information obtained by the building sensor devices with the intelligence platform. Additionally, or alternatively, the intelligence platform may subscribe to receive information from the building sensor devices.

In some implementations, the human sensor devices may be disposed on, over, or otherwise provided for a human associated with the package. The human may be disposed proximate to the package, advancing towards the package, and/or include the recipient of the package. In some implementations, the human sensor devices may be disposed inside of a user device associated with the human. In some implementations, the human (i.e., a user) may opt-in to sharing information obtained by the human sensor devices with the intelligence platform. The human may be, but does not have to be, the recipient of the package. For example, where multiple humans opt-in to sharing location information or other information obtained by the human sensor devices disposed in multiple, respective user devices, the intelligence platform may monitor the locations, movement, biometric data, and/or the like for any of the humans within a given distance (e.g., distances less than one mile, distances less than 100 yards, distances less than 100 feet, etc.) of the package.

For example, the human sensor devices may include accelerometers, location sensors, positioning sensors, health sensors (e.g., pulmonary sensors, physical stress sensors, sweat sensors, respiratory sensors, etc.), biometric sensors (e.g., fingerprint scanners, iris scanners, etc.), and/or the like. As an example, the accelerometers and/or positioning sensors in a user device may be used to detect a human approaching or advancing towards the package. The intelligence platform may monitor such information for detecting the safety and/or vulnerability of the package. Similarly, the positioning sensors in the recipient's user device may be used to detect the spatial location of the recipient, which may be monitored to determine whether the recipient is outside of a normal geographic region in which the recipient is normally located. The intelligence platform may monitor such information for detecting the safety and/or vulnerability of the package. In some implementations, the health sensors may detect pulmonary or vascular information (e.g., heart rate, breathing, blood pressure etc.) associated with a human. As described herein, the intelligence platform may monitor such health information for detecting the safety and/or vulnerability of the human, as the intelligence platform may determine not only when to retrieve or protect a package, but also when to retrieve or protect a human.

Figure 1B:
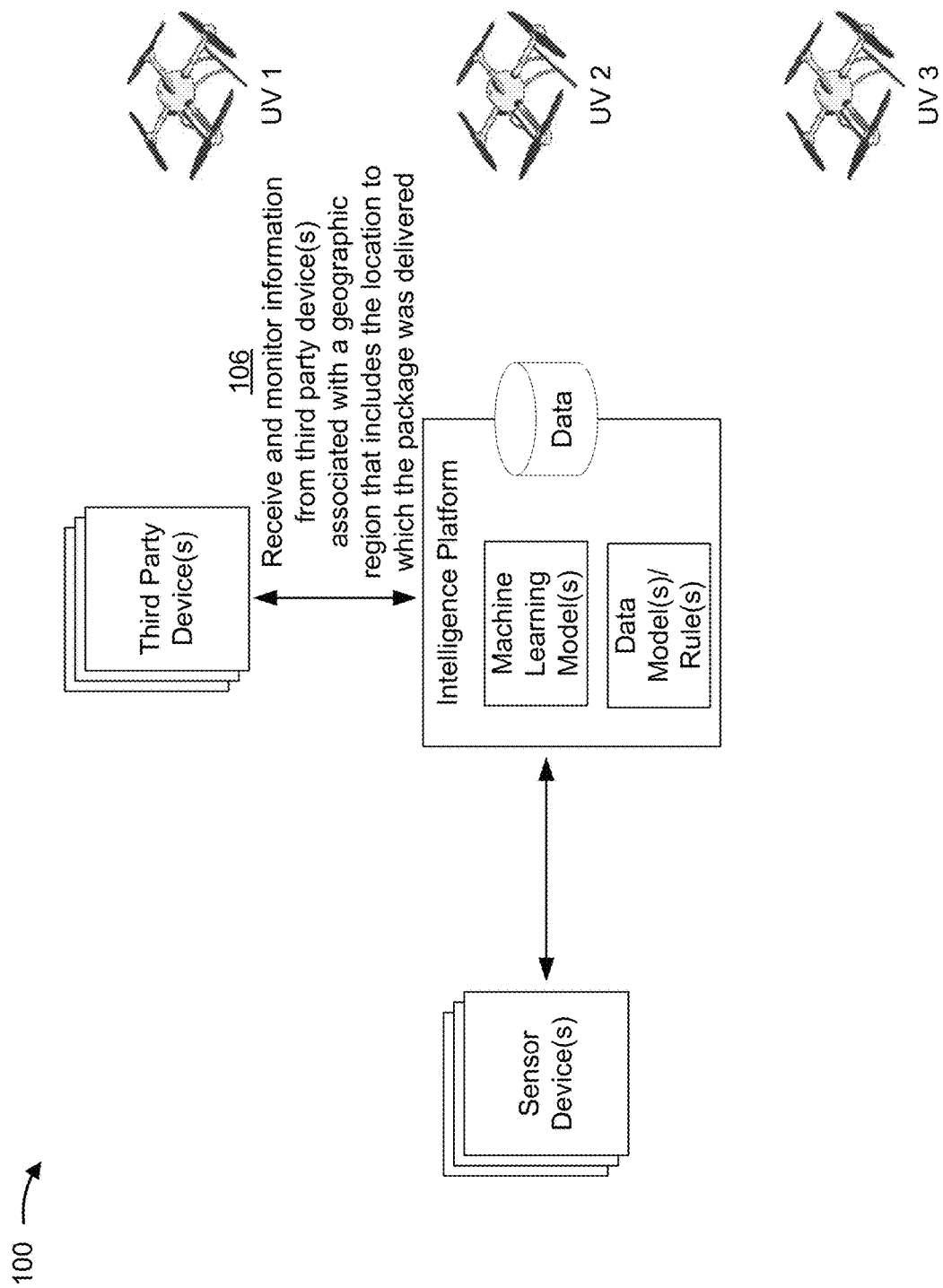

As shown in FIG. 1B, and by reference number 106, the intelligence platform may receive and monitor information from third party devices associated with a geographic region that includes the location to which the package was delivered. In various implementations, the third party devices may include servers or computing devices configured to perform news reporting services, emergency condition reporting services, traffic reporting services, weather reporting services, police reporting services, fire department reporting services, ambulatory reporting services, crime reporting services, AMBER alert reporting services, homeland security reporting services, social media reporting services, demographic reporting services, credit reporting services, and/or the like. In some implementations, the third party devices may include a financial service reporting device (e.g., for reporting purchasing behavior associated with the recipient of the package), and/or the like. In some implementations, the intelligence platform may utilize the information received from the third party devices, alone, or in combination with the information received from the sensor devices described in FIG. 1A, in determining whether to retrieve or protect a package. Additionally, or alternatively, in some implementations, the intelligence platform may utilize the information received from the third party devices, alone, or in combination with the information received from the sensor devices described in FIG. 1A, in determining whether to retrieve or protect a human.

In some implementations, the third party devices may export, stream, or otherwise transmit the third party data in real-time, or near real-time, to the intelligence platform. In some implementations, the intelligence platform may subscribe to receive data from the third party devices. As an example, at least one of the third party devices may include a news reporting device. The intelligence platform may monitor the data from the news reporting device for determining crime information, weather information, and/or other news related data that may affect the geographic region to which the package was delivered. The intelligence platform may use the third party data in determining whether to retrieve or protect the package. As another example, at least one of the third party devices may include a social media reporting device. The intelligence platform may monitor the data from the social media reporting device for determining information regarding the recipient of the package, information regarding social events that may affect the geographic region to which the package was delivered, and/or the like for use in determining whether to retrieve or protect the package.

As another example, at least one of the third party devices may include a financial service reporting device. The intelligence platform may monitor the data from the financial service reporting device for determining information regarding the recipient, such as purchasing information to determine whether the recipient is in the geographic region associated with the package or in another location that may factor into delays associated with the recipient receiving or taking possession of the package. Where the intelligence platform determines, using information supplied from the financial service reporting device, that the recipient is traveling or out of town, the intelligence platform may use such information in determining whether to retrieve or protect the package. The recipient may opt-in to sharing personal information (e.g., purchasing behavior information, location information, social media information, etc.) with the intelligence platform so that the intelligence platform may retrieve or protect the package on behalf of the recipient should the intelligence platform determine the package to be vulnerable.

In some implementations, the intelligence platform may store a portion of the real-time data received from the sensor devices and/or the third party devices for a period of time by which the intelligence platform may compare the real-time data to earlier received data for monitoring and/or detecting changes in conditions (e.g., weather conditions, crime conditions, etc.) associated with the package and/or the geographic region to which the package was delivered.

Figure 1C:
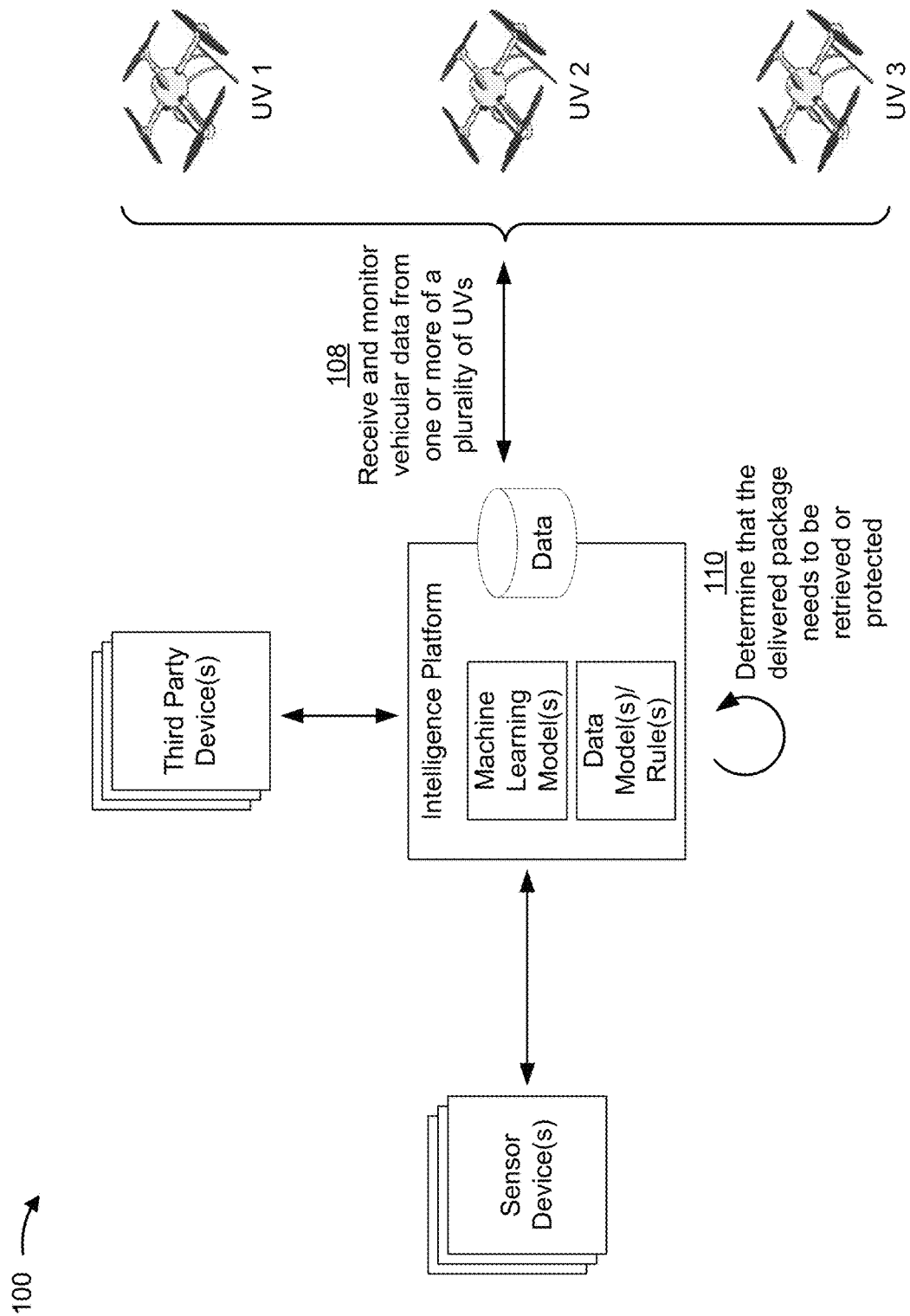

As shown in FIG. 1C, and by reference number 108, the intelligence platform may receive and monitor vehicular data from one or more of a plurality of UVs. The UVs may send, and the intelligence platform may receive (e.g., by a wired or wireless communication link) data regarding the real-time locations of the UVs. In this regard, the UVs may include sensor devices by which the real-time locations may be determined, such as Global Navigation Satellite System receivers, GPS receivers, GLONASS receivers, Galileo receivers, BeiDou receivers, and/or other regional satellite system receivers.

In some implementations, the intelligence platform may receive the vehicular data directly from the UVs. In some implementations, the vehicular data may be received from another server (not shown), such as a UV control server that monitors, tracks, and/or otherwise controls the UVs. In some implementations, the intelligence platform may receive real-time, or near real-time, location information associated with the UVs. Other examples of vehicular data obtained by the intelligence platform may include wind speed data associated with the geographic locations of the UVs, travel speed of the UVs, travel range data associated with the UVs, traffic data associated with traffic conditions in geographic locations of the UVs, fuel data for the UVs (i.e., how much fuel do the UVs have), battery power data (i.e., how much battery power do the UVs have), and/or the like.

As shown by reference number 110, the intelligence platform may determine that the delivered package needs to be retrieved or protected. In some implementations, retrieving the package may include causing a UV to exert physical control over the package for physically removing the package from the location to which the package was delivered. Retrieving the package may include, for example, physically moving the package from the location to which the package was delivered to a different location. The different location may include, for example, a location of the sender of the package, a real-time location of the recipient of the package, a location of a delivery service (e.g., a warehouse, a delivery truck, etc.), an alternative delivery location specified by the sender or recipient, and/or the like.

Protecting the package may, but does not have to, include physically moving the package relative to the location where the package was delivered. Protecting the package may include performing an action to physically protect the package (e.g., deploying an umbrella to protect the package, dousing water on a fire to protect the package, etc.), contacting first responders to assist in protecting the package, and/or the like. Protecting the package may also include recording audio data associated with the package, recording video data associated with the package, capturing image data associated with the package, and/or the like for use by first responders or others that may assist in protecting the package.

In determining that the delivered package needs to be retrieved or protected, the intelligence platform may access one or more data models, one or more machine learning models, one or more rules, and/or logic whereby the intelligence platform assesses the vulnerability of the package based on the real-time information being received from the sensor devices and/or the third party devices. In some implementations, the intelligence platform may determine, using a data model or a machine learning model, a score for the package based on the real-time information received from the sensor devices, the third party devices, or a combination of the real-time information received from the sensor devices and the third party devices. In some implementations, the score predicts a measure of vulnerability of the package. The intelligence platform determines, based on the score, whether to retrieve or protect the package.

As an example, the data model or the machine learning model may receive, as input, information from the weather reporting services and/or the weather sensor devices to predict whether a storm is imminent and/or whether the package is likely to be damaged due to the storm based on the score output by the data model or the machine learning model. Where the score is low, the intelligence platform may determine that the package is not as vulnerable to being damaged by the storm and may decide to leave the package unattended. Where the score is high, the intelligence platform may determine that the package is vulnerable to being damaged by the storm and may decide to retrieve or protect the package.

As another example, the data model or the machine learning model may receive, as input, information from crime reporting services and/or human sensor devices to predict whether theft of the package is likely or imminent based on the score output by the data model or the machine learning model. For example, where the crime reporting services indicate that a theft has occurred in the geographic region corresponding to the location where the package was delivered and the human sensor devices indicate that a human other than the recipient is quickly approaching the package, the intelligence platform may determine, based on the score using such information, to retrieve or protect the package. Where the score is low, the intelligence platform may determine that the package is not as vulnerable to being stolen and may decide to leave the package unattended. Where the score is high, the intelligence platform may determine that the package is vulnerable to being stolen and may decide to retrieve or protect the package.

As another example, the data model or the machine learning model may receive, as input, information from the package sensor devices and/or the weather sensor devices to predict whether the contents of the package are likely to become unsafe, unhealthy, or die due to the conditions inside or outside of the package based on the score output by the data model or the machine learning model. Such predictions may be useful, for example, where the package contains (e.g., fully, or partially) food, a perishable item, a live-plant, a live-animal, and/or the like. For example, the package may include a refrigerated box containing food or medicine. The machine learning model may receive, as input from the package sensor devices, the temperature inside of the package, the humidity inside of the package, input from the weather sensor devices regarding the weather conditions outside of the package, and/or input from other devices, including, for example, information regarding the amount of time that the package has been left unattended. The machine learning model may generate a score based on the information received from the sensor devices and/or the third party devices, the score being indicative of the vulnerability of the contents of the package becoming unsafe, unhealthy, unfit for consumption, dying, and/or the like. Where the score is low, the intelligence platform may determine that the contents of the package are not as vulnerable to spoiling, perishing, dying, and/or the like, and may decide to leave the package unattended. Where the score is high, the intelligence platform may determine that the contents of the package are vulnerable to spoiling, perishing, dying, and/or the like, and may determine to retrieve or protect the package.

As still another example, the data model or the machine learning model may receive, as input, information from the human sensor devices and/or social media reporting services to predict whether the recipient may be delayed in taking possession of the package. Such predictions may be useful, for example, where the package contains sensitive information or valuable contents, such as a credit card, a debit card, cash, a check, or a cashier's check. Where the recipient is predicted to be delayed, the intelligence platform may determine to retrieve the package if the package includes sensitive information or valuable contents. For example, the intelligence platform may receive, as input, location information received from human sensor devices associated with the recipient's user device (e.g., smartphone, wearable computer (e.g., watch, eyeglasses, etc.), laptop, etc.), alone, or in combination with information received from the social media reporting services to predict whether the recipient is traveling, departing from normal routines, and/or the like, which would render the package vulnerable to being left unattended for longer periods of time. Where the score is low, the intelligence platform may decide to leave the package unattended. Where the score is high, the intelligence platform may determine to retrieve the package.

As other examples, the intelligence platform may utilize the data model or the machine learning model to generate a score that predicts whether the package is in imminent danger of being damaged by smoke, water, hail, fire, flooding, and/or the like, and determine whether to retrieve or protect the package based on the score. As another example, the intelligence platform may utilize the data model or the machine learning model to generate a score based on proximity or positioning sensor devices that predicts whether the package is moving (e.g., by way of the package being stolen), and determine to retrieve or protect the package based on the score. Any or all of the examples described herein can be used alone, or in combination.

Additionally, or alternatively, the intelligence platform may use or apply one or more rules or logic (e.g., trigger based rules or logic) in determining whether to retrieve or protect the package based on the real-time information received from the sensor devices, the third party devices, and/or combinations of the real-time information received from the sensor devices and the third party devices. As an example, the intelligence platform may determine, using information received from the package sensor devices alone, that an internal temperature of the package satisfies a threshold (e.g., the temperature increases above a threshold, the temperature decreases below a threshold, etc.), and trigger the automatic retrieval or protection of the package based on satisfying the threshold. As another example, the intelligence platform may determine, using information received from the building sensor devices alone, that a portion of the building is on fire, and trigger the automatic retrieval or protection of the package based on determining that the portion of the building is on fire.

Additionally, or alternatively, and in some implementations, the intelligence platform may determine that a person needs to be retrieved or protected. For example, the intelligence platform may receive, as input to a data model, a machine learning model, and/or rules based logic, real-time health data associated with the person. The health data may include, for example, pulmonary information, or respiratory information associated with the person. Such information may be received from human sensor devices disposed in the person's phone, on the person's body, and/or the like. The intelligence platform may determine, based on the model, a score indicative of the vulnerability of the person. The score may indicate whether the person is vulnerable to experiencing an emergency health condition (e.g., a heart attack, a stroke, etc.) and/or whether the person is experiencing an emergency situation (e.g., in an automobile wreck, hit by an automobile, being abducted, etc.). The intelligence platform may determine whether to retrieve or protect the person based on the score. In some implementations, a particular UV may be caused to retrieve the person (e.g., by deploying a rope, ladder, net, etc.) or protect the person (e.g., by deploying food, water, medicine, a medical device, an umbrella, a mask, a lighting device, a protective device to protect the person, etc.) as described herein.

Additionally, or alternatively, the intelligence platform may determine whether to retrieve the package based on receiving input from the recipient. For example, the package may be contained in a protective structure (e.g., protective box, cover, etc.). The recipient may notify the intelligence platform that the package has been received and the intelligence platform may select a particular UV to retrieve the package. The protective structure may be re-used multiple times for delivering multiple packages.

Figure 1D:
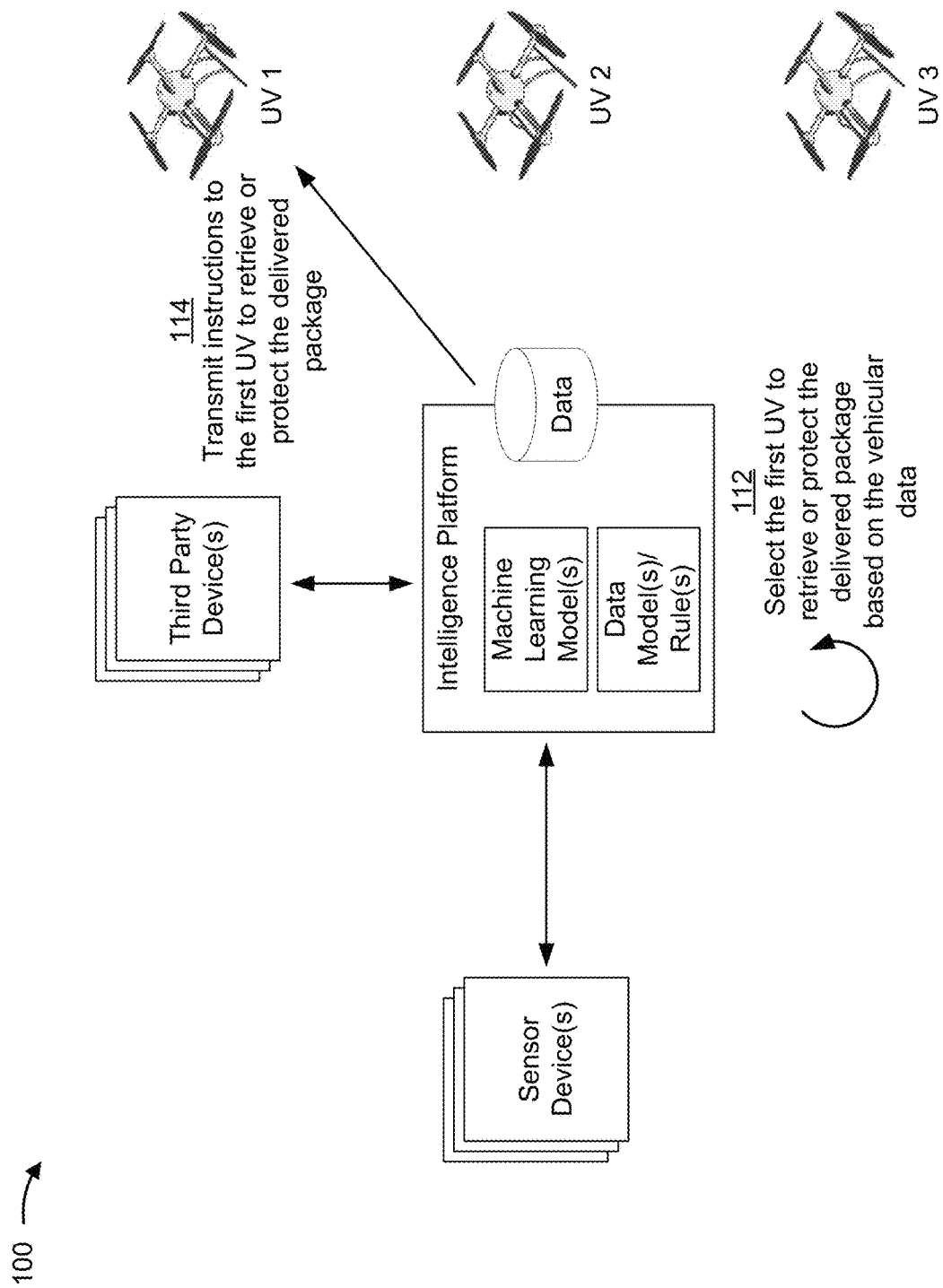

As shown in FIG. 1D, and by reference number 112, the intelligence platform may select a particular UV (i.e., the first UV) to retrieve or protect the package, or the person, based on the vehicular data received from the plurality of UVs. In some implementations, the intelligence platform utilizes a data model, a machine learning model, or rules or logic in selecting the first UV to retrieve or protect the package. For example, the intelligence platform may receive, as input, the vehicular data (e.g., location of the UVs, travel speed of the UVs, travel range of the UVs, traffic conditions, etc.) for the plurality of UVs and generate a score. The score may predict a measure of confidence that the first UV is capable of retrieving or protecting the package. The intelligence platform may select the first UV to retrieve or protect the package based on the score. For example, where the score for the first UV is higher than the scores for other UVs, the intelligence platform may select the first UV to retrieve or protect the package. Where the score for the first UV is lower than scores for other UVs, the intelligence platform may select another UV to retrieve or protect the package.

In some implementations, the intelligence platform may use or apply rules or logic in selecting the first UV to retrieve or protect the package. For example, the intelligence platform may determine that the first UV is the closest UV to the location where the package is delivered, and automatically select the first UV to retrieve or protect the package. Additionally, or alternatively, the intelligence platform may select the particular UV to protect or retrieve a person based on data models, machine learning models, or rules based logic that may incorporate additional vehicular data, such as, for example, the size of the UV, the weight-limit associated with the UV, and/or other data pertinent to retrieving or protecting the person.

Still referring to FIG. 1D, and as shown by reference number 114, the intelligence platform may transmit one or more instructions to the first UV to retrieve or protect the package based on selecting the first UV from the plurality of UVs. In some implementations, the intelligence platform may select a single UV to retrieve or protect the package and/or a person. In some implementations, the intelligence platform may select multiple UVs to retrieve or protect the package and/or the person. In some implementations, the instructions may be transmitted directly to the first UV selected by the intelligence platform. Additionally, or alternatively, the instructions may be transmitted to a server or controller that controls the first UV. In some implementations, the instructions may be transmitted using a wired or wireless connection. In some implementations, the instructions transmitted to the first UV may cause the UV to take an action as described herein.

Figure 1E:
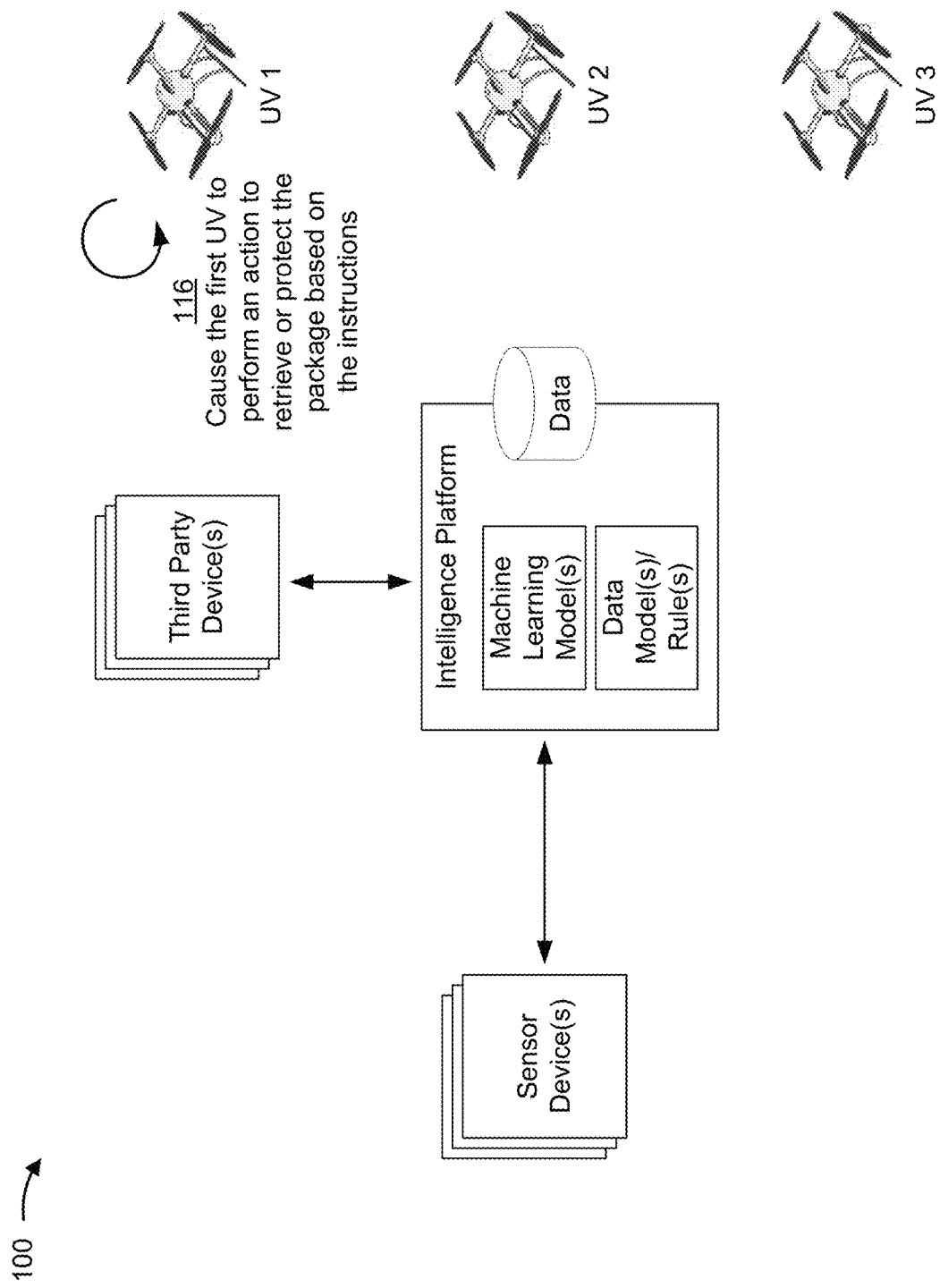

As shown in FIG. 1E, and by reference number 116, the first UV may perform at least one action to retrieve or protect the package based on the instructions received from the intelligence platform. Example actions performed by the first UV may include, without limitation, deploying an item to retrieve or protect the package, recording audio data associated with retrieving or protecting the package, recording video data associated with retrieving or protecting the package, capturing image data associated with retrieving or protecting the package, contacting one or more first responders to assist with retrieving or protecting the package, removing and redelivering the package to an alternative location, and/or the like. In some implementations, the actions performed by the first UV may also be used to retrieve or protect a person as described herein.

Example items that may be deployed by the first UV include, without limitation, a net, a rope, a hook, a magnet, an umbrella, a mask (e.g., a smoke mask, a chemical mask, a dust mask, etc.), a tool, an inflatable device, food, water, medicine, and/or the like. In various implementations, such items may be used to retrieve or protect the package or a person. As an example, the first UV may deploy a hook, rope, net, or magnetic member to retrieve the package or the person. As another example, the first UV may deploy a protective net, blanket, umbrella, or covering to protect the package or the person. As another example, the first UV may deploy a net or restrictive binding device to detain a thief attempting to steal the package and/or a criminal attempting to assault a person. As further examples, the first UV may deploy a light to illuminate a dark path for a person, food, drink, or medicine to assist the person, a medical tool (e.g., defibrillator, Epinephrine injecting tool, etc.) to assist the person, and/or the like. In some implementations, the person may communicate with the first UV, and/or first responders by way of communicating with the first UV, to indicate that help, retrieval, and/or protection is not needed. As further examples, the first UV may obtain and transmit a live video feed to the police or a security agency in connection with retrieving or protecting the package or the person, obtain and transmit a live audio feed from a first responder service in connection with retrieving or protecting the package or the person, and/or the like. Other actions may be contemplated.

Figure 1F:
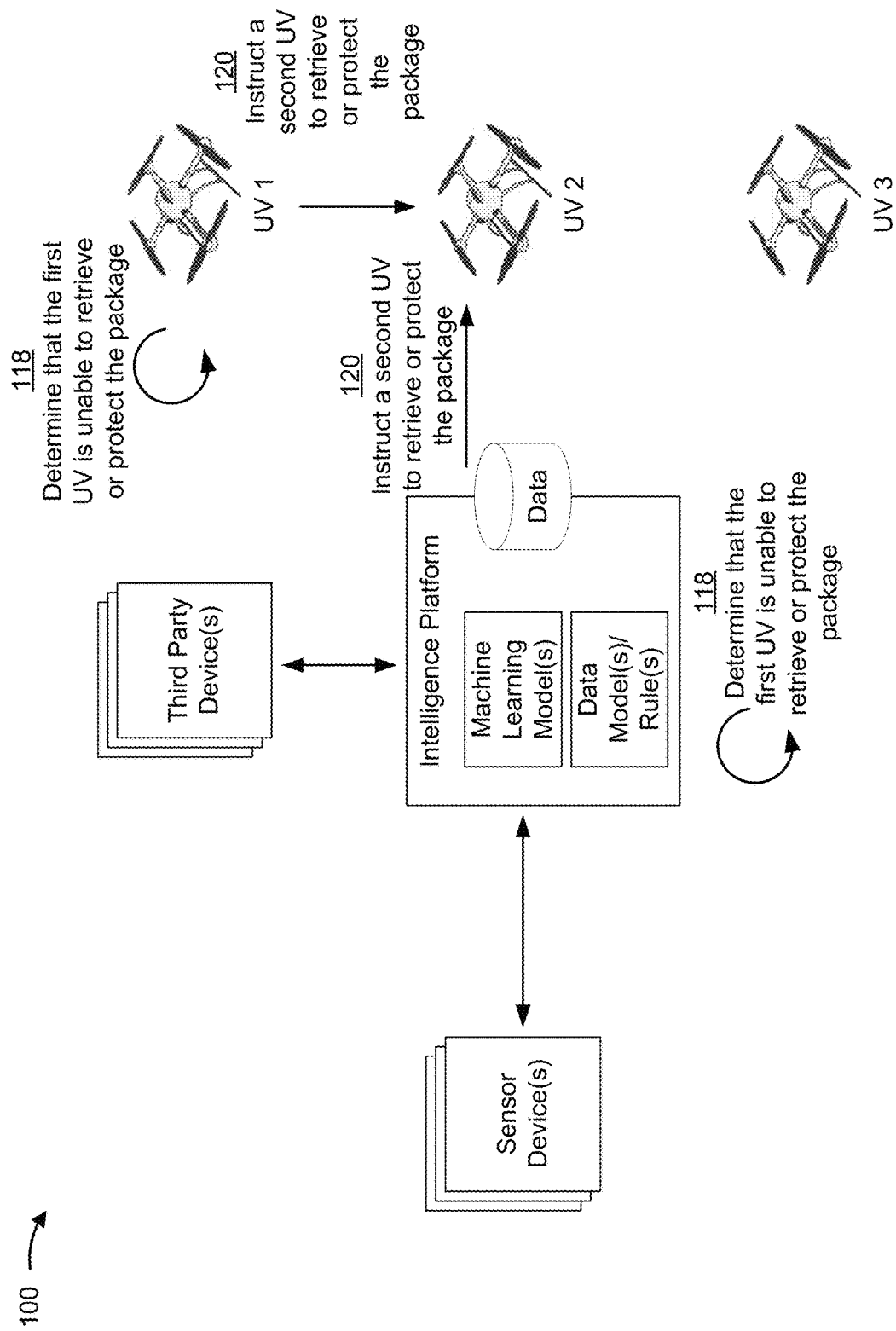

As shown in FIG. 1F, and by reference number 118, the first UV and/or the intelligence platform may determine that the first UV is unable to retrieve the package. In some implementations, the intelligence platform may determine that the first UV is unable to retrieve or protect the package based on real-time vehicular data obtained from the first UV. For example, the intelligence platform may determine that the first UV is depleted of energy and is unable to retrieve or protect the package based on data received from the first UV, that the first UV is damaged or lost based on data received (or not received) from the first UV, and/or the like. In some implementations, the first UV is a self-aware device whereby the first UV may be aware of and/or detect a system or device failure that renders the first UV incapable of retrieving or protecting the package.

As shown by reference number 120, a second UV may be instructed to retrieve or protect the package. In some implementations, the second UV may be selected from among the remaining plurality of UVs using the same or similar criteria and/or techniques as described above for selecting the first UV. The intelligence platform or the first UV may instruct the second UV to retrieve or protect the package. In some implementations, the intelligence platform may transmit the instruction to the second UV or a server controlling the second UV to cause the second UV to retrieve or protect the package. In some implementations, the first and second UVs may be configured in a fleet of UVs, whereby the first UV may communicate signals and/or directions to the second UV by way of using other UVs in the fleet of UVs to communicate such signals and/or directions. For example, the first UV, using a mesh network of UV devices to relay the signals and/or directions, may instruct the second UV to retrieve or protect the package. The first UV may communicate the instructions directly to the second UV, using the mesh network of UV devices, and/or devices on the ground (e.g., in the case of aerial UVs) to relay the signals and/or directions to the second UV instructing the second UV to retrieve or protect the package. The intelligence platform may discontinue monitoring information associated with the sensor devices and/or the third party devices associated with the package that is delivered upon receiving confirmation that the package has been received by the recipient, confirmation that the package is secure at an alternative location, and/or the like.

The intelligence platform may intelligently determine whether to retrieve or protect a package or a person based on real-time information associated with a plurality of conditions or variables, such conditions or variables being subject to change over time. In this way, the security associated with leaving packages unattended for any amount of time may increase.

The intelligence platform may intelligently determine whether to retrieve or protect hundreds, thousands, or more packages in a geographic region based on real-time information associated with hundreds, thousands, millions, or more data points for the geographic area corresponding to where the package was delivered. In this way, resources otherwise required to locate lost, stolen, or damaged packages, re-generate orders and/or delivery schedules for the lost, stolen, or damaged packages, and/or track the lost, stolen, or damaged packages may be obviated.

Although retrieving and protecting packages and persons has been mainly described using FIGS. 1A-1F, the intelligence platform may also be configured to retrieve and protect livestock, animals, artillery, vehicles, or other property as described herein.

As indicated above, FIGS. 1A-1F are provided merely as an example. Other examples are possible and may differ from what was described with regard to FIGS. 1A-1F.

Figure 2:
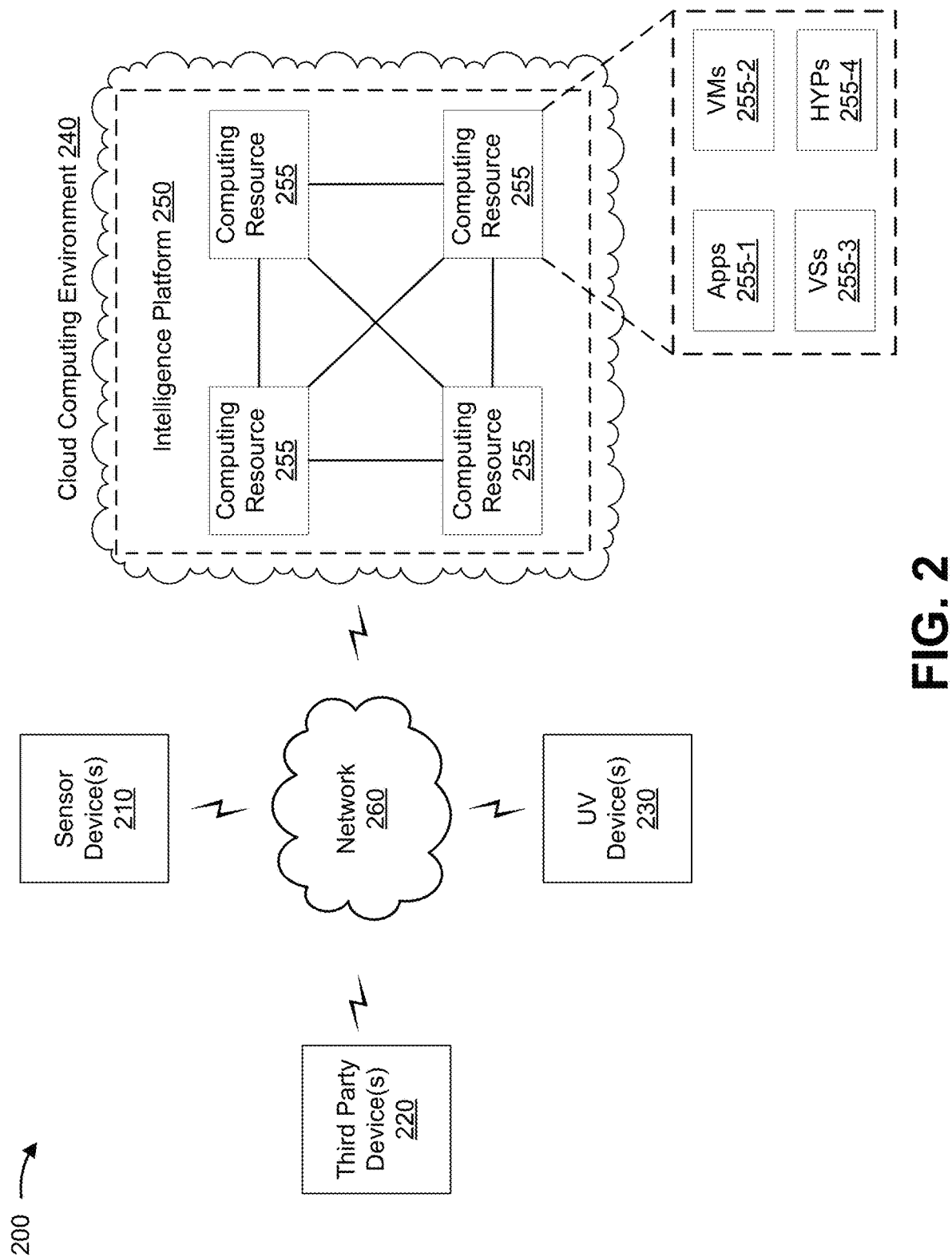
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more sensor devices 210, one or more third party devices 220, one or more UV devices 230, a cloud computing environment 240, an intelligence platform 250, a computing resource 255, and a network 260. Devices of environment 200 may interconnect via wired connections, wireless connections, or a combination of wired and wireless connections.

Sensor device 210 includes one or more wired or wireless devices capable of receiving, generating, storing, transmitting, processing, detecting, and/or providing information associated with determining, implementing, and/or scheduling the retrieval and/or protection of a delivered package or a person. Example sensor devices 210 include a temperature sensor, a moisture sensor, a humidity sensor, an accelerometer, a proximity sensor, a light sensor, a noise sensor, a pressure sensor, an ultrasonic sensor, a smoke sensor, a gas sensor (e.g., an oxygen sensor, a carbon monoxide sensor, a carbon dioxide sensor, etc.), a chemical sensor, an alcohol sensor, a positioning sensor, a capacitive sensor, a timing device, an infrared sensor, an active sensor (e.g., sensors that require an external power signal), a passive sensor (e.g., sensors that do not require an external power signal), a biological sensor, a radioactive sensor, a magnetic sensor, an electromagnetic sensor, an analog sensor, a digital sensor, and/or the like. Sensor device 210 may sense or detect a condition or information and send, using a wired or wireless communication interface, the detected condition, or information to other devices in environment 200, such as intelligence platform 250. As an example, the sensor may be associated with a user device (e.g., a computer, a tablet computer, a laptop computer, a mobile phone, a smartphone, a wearable computer, etc.) that senses information regarding the user and/or the user device via executing an application on the user device. The information detected by the user device may be transmitted, using a communications interface on the user device, to intelligence platform 250 for use in determining, implementing, and/or scheduling the retrieval and/or protection of a delivered package or person.

Third party device 220 includes one or more one or more devices capable of receiving, generating, storing, transmitting, processing, and/or providing information associated with determining, implementing, and/or scheduling the retrieval and/or protection of a delivered package or a person. For example, third party device 220 may include a communication and/or computing device, such as a server, computer, mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. Third party device 220 may be capable of providing a variety of information upon request and/or pursuant to a subscription by intelligence platform 250. For example, third party device 220 may be associated with a weather server, which may provide weather-related information (e.g., current conditions, forecasted conditions, or the like) for particular geographic areas. As another example, third party device 220 may be associated with a traffic server, which may provide traffic-related information (e.g., automobile traffic, air traffic, or the like) for particular geographic areas and/or locations. As another example, third party device 220 may be associated with an emergency reporting server or a first responder server, which may provide crime-related information via crime reporting services (e.g., an increase or uptick in crime in a particular geographic area, a specific crime in a particular geographic area, etc.), AMBER alert information (e.g., information regarding a missing child or children in a particular area, etc.), terror-related information (e.g., information regarding changes in the terror threat, information from the national terrorism advisory system or homeland security, etc.), and/or the like. As further example, third party device 220 may be associated with servers providing map services, social networking services, air traffic control services, police services, medical emergency services, fire services, and/or the like.

UV device 230 includes one or more one or more devices capable of receiving, generating, storing, transmitting, processing, and/or providing information associated with determining, implementing, and/or scheduling the retrieval and/or protection of a delivered package or a person. For example, UV device 230 may include a vehicular device equipped with communication and/or computing equipment, such as an unmanned ground vehicle (e.g., an autonomous car, an autonomous off-road vehicle, etc.), an unmanned aerial vehicle (e.g., a drone, a quadcopter, etc.), an unmanned surface or sub-surface vehicle (e.g., an autonomous boat, an autonomous submergible device, etc.), and/or the like. By way of example, UV device 230 may be an autonomous vehicle capable of retrieving and delivered package or person from one location and depositing or re-delivering the package or person to another location. As another example, UV device 230 may be an autonomous vehicle capable of protecting a delivered package or person, until a time at which protection may no longer be required. In some implementations, UV device 230 may include an aircraft that has an area for at least one human passenger but is unmanned by way of the control of the vehicle being autonomous and not performed by a human.

UV device 230 may include one or more sensors configured to determine the location and/or route of the UV device 230 for navigating UV device 230 to retrieve or protect a delivered package or person. For example, UV device 230 may include Global Navigation Satellite System (GNSS) receivers, including receivers for GPS, GLONASS, Galileo, BeiDou, and/or other satellite systems. UV device 230 may be programmed with travel routes, coordinates, and/or the like.

Cloud computing environment 240 includes an environment that delivers computing as a service, whereby shared resources, services, etc. may be provided to determine, implement, and/or schedule the retrieval and/or protection of a delivered package or person. Cloud computing environment 240 may provide computation, software, data access, storage, and/or other services that do not require end-user knowledge of a physical location and configuration of a system and/or a device that delivers the services. As shown, cloud computing environment 240 may include intelligence platform 250 and one or more computing resources 255.

Intelligence platform 250 includes one or more devices capable of receiving, generating, storing, processing, and/or providing information associated with determining the retrieval and/or protection of delivered packages and/or people. While the example environment 200 indicates that intelligence platform 250 is implemented in a cloud computing environment 240, in some implementations, intelligence platform 250 may be implemented by one or more other types of devices as well, such as a server, computer, laptop computer, tablet computer, handheld computer, or the like. Intelligence platform 250 is capable of using data provided by sensor device 210, third party device 220, and/or UV device 230 to determine, implement, and schedule the retrieval and/or protection of a package and/or person. Intelligence platform 250 may, in some implementations, include or otherwise have access to other resources to facilitate the intelligent determination and implementation of package or person retrieval and/or protection, including resources for generating models via machine learning, resources for storing historical data, or the like.

Computing resource 255 includes one or more personal computers, workstation computers, server devices, or another type of computation and/or communication device. In some implementations, computing resource 255 may host intelligence platform 250. The cloud resources may include compute instances executing in computing resource 255, storage devices provided in computing resource 255, data transfer devices provided by computing resource 255, etc. In some implementations, computing resource 255 may communicate with other computing resources 255 via wired connections, wireless connections, or a combination of wired and wireless connections.

As further shown in FIG. 2, computing resource 255 may include a group of cloud resources, such as one or more applications ("APPs") 255-1, one or more virtual machines ("VMs") 255-2, virtualized storage ("VSs") 255-3, one or more hypervisors ("HYPs") 255-4, or the like.

Application 255-1 includes one or more software applications that may be provided to or accessed by third party device 220 and/or UV device 230. Application 255-1 may eliminate a need to install and execute the software applications on third party device 220 and/or UV device 230. For example, application 255-1 may include software associated with intelligence platform 250 and/or any other software capable of being provided via cloud computing environment 240. In some implementations, one application 255-1 may send/receive information to/from one or more other applications 255-1, via virtual machine 255-2.

Virtual machine 255-2 includes a software implementation of a machine (e.g., a computer) that executes programs like a physical machine. Virtual machine 255-2 may be either a system virtual machine or a process virtual machine, depending upon use and degree of correspondence to any real machine by virtual machine 255-2. A system virtual machine may provide a complete system platform that supports execution of a complete operating system ("OS"). A process virtual machine may execute a single program, and may support a single process. In some implementations, virtual machine 255-2 may execute on behalf of a user (e.g., a user of sensor device 210, third party device 220, UV device 230, and/or computing resource 255), and may manage infrastructure of cloud computing environment 240, such as data management, synchronization, or long-duration data transfers.

Virtualized storage 255-3 includes one or more storage systems and/or one or more devices that use virtualization techniques within the storage systems or devices of computing resource 255. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 255-4 provides hardware virtualization techniques that allow multiple operating systems (e.g., "guest operating systems") to execute concurrently on a host computer, such as computing resource 255. Hypervisor 255-4 may present a virtual operating platform to the guest operating systems, and may manage the execution of the guest operating systems. Multiple instances of a variety of operating systems may share virtualized hardware resources.

Network 260 includes one or more wired and/or wireless networks. For example, network 260 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
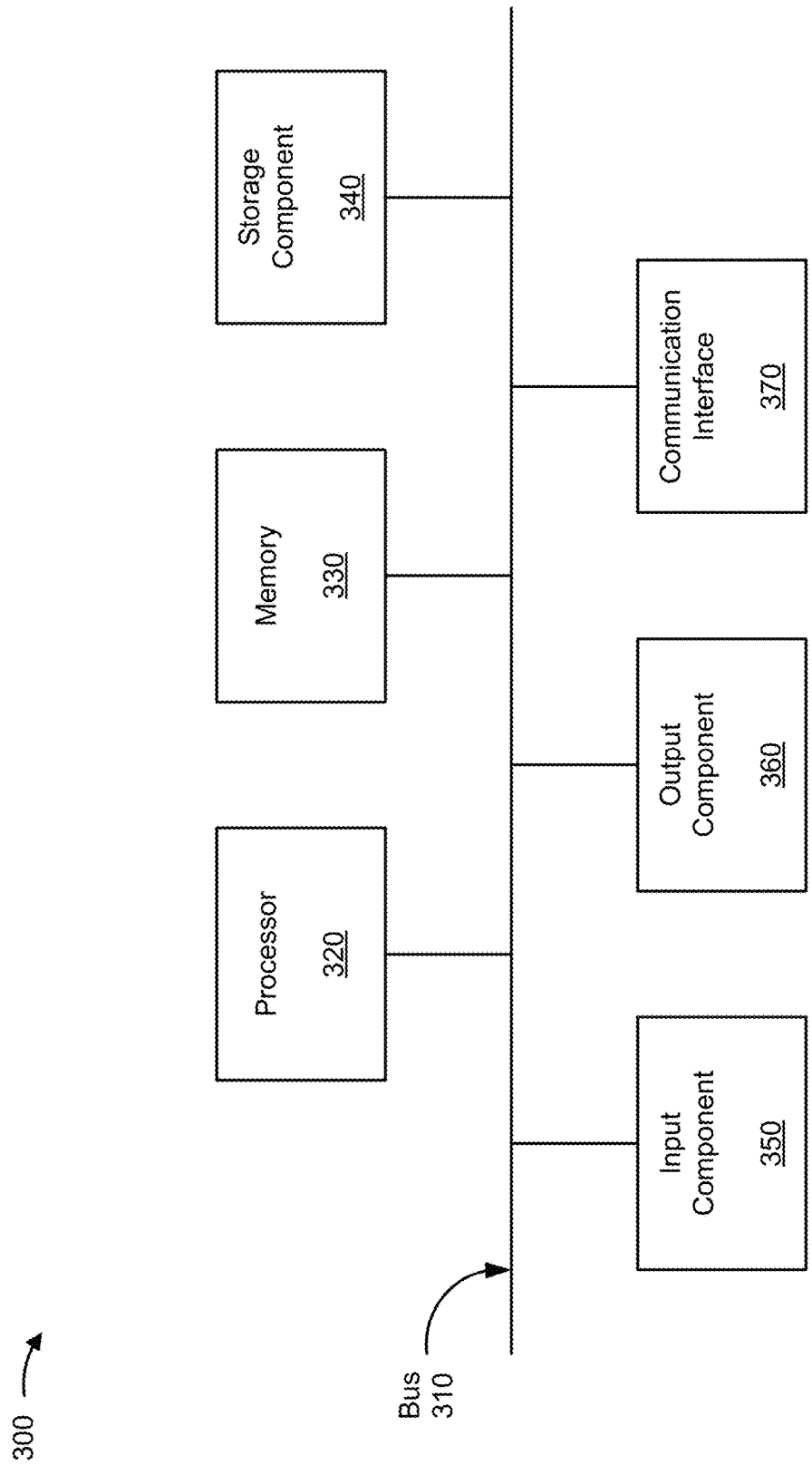
FIG. 3 is a diagram of example components of one or more devices of FIG. 2.

FIG. 3 is a diagram of example components of a device 300. Device 300 may correspond to sensor device 210, third party device 220, UV device 230, intelligence platform 250, and/or computing resource 255. In some implementations, sensor device 210, third party device 220, UV device 230, intelligence platform 250, and/or computing resource 255 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
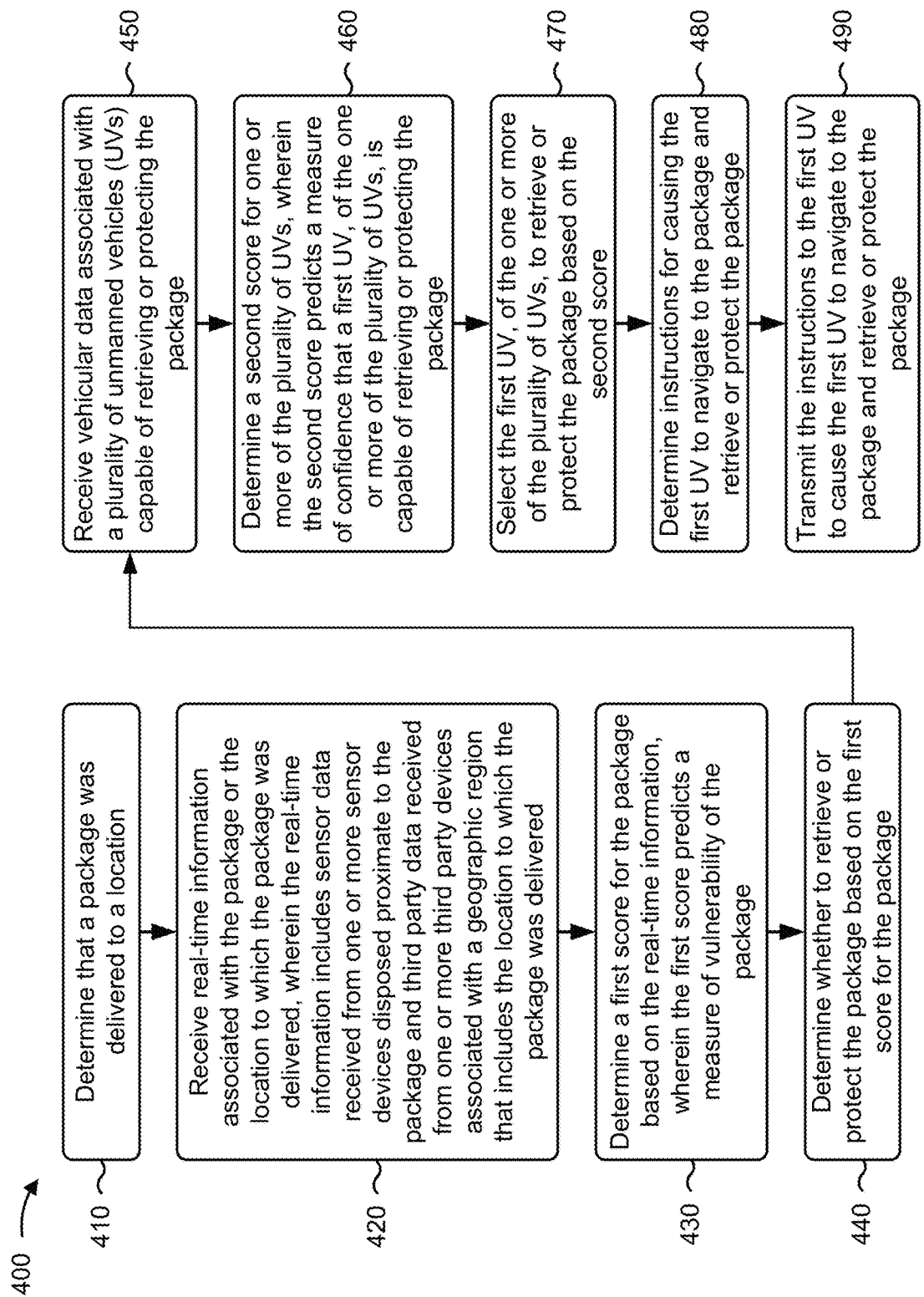
FIG. 4 is a flow chart of an example process for determining whether to retrieve or protect a delivered package using an unmanned vehicle (UV).

FIG. 4 is a flow chart of an example process 400 for determining whether to retrieve or protect a delivered package using a UV. In some implementations, one or more process blocks of FIG. 4 may be performed by an intelligence platform (e.g., intelligence platform 250). In some implementations, one or more process blocks of FIG. 4 may be performed by another device or a group of devices separate from or including the intelligence platform, such as a sensor device (e.g., sensor device 210), a third party device (e.g., third party device 220), a UV device (e.g., UV device 230), and a computing resource (e.g., computing resource 255).

As shown in FIG. 4, process 400 may include determining that a package was delivered to a location (block 410). For example, the intelligence platform (e.g., intelligence platform 250, using computing resource 255, processor 320, memory 330, storage component 340, input component 350, communication interface 370, and/or the like) may determine that a package was delivered to a location, as described above in connection with FIGS. 1A-1F.

As further shown in FIG. 4, process 400 may include receiving real-time information associated with the package or the location to which the package was delivered, wherein the real-time information includes sensor data received from one or more sensor devices disposed proximate to the package and third party data received from one or more third party devices associated with a geographic region that includes the location to which the package was delivered (block 420). For example, the intelligence platform (e.g., intelligence platform 250, using computing resource 255, processor 320, memory 330, storage component 340, input component 350, communication interface 370, and/or the like) may receive real-time information associated with the package or the location to which the package was delivered, as described above in connection with FIGS. 1A-1F. In some implementations, the real-time information includes sensor data received from one or more sensor devices disposed proximate to the package and third party data received from one or more third party devices associated with a geographic region that includes the location to which the package was delivered.

As further shown in FIG. 4, process 400 may include determining a first score for the package based on the real-time information, wherein the first score predicts a measure of vulnerability of the package (block 430). For example, the intelligence platform (e.g., intelligence platform 250, using computing resource 255, processor 320, memory 330, storage component 340, and/or the like) may determine a first score for the package based on the real-time information, as described above in connection with FIGS. 1A-1F. In some implementations, the first score predicts a measure of vulnerability of the package.

As further shown in FIG. 4, process 400 may include determining whether to retrieve or protect the package based on the first score for the package (block 440). For example, the intelligence platform (e.g., intelligence platform 250, using computing resource 255, processor 320, memory 330, storage component 340, and/or the like) may determine whether to retrieve or protect the package based on the first score for the package, as described above in connection with FIGS. 1A-1F.

As further shown in FIG. 4, process 400 may include receiving vehicular data associated with a plurality of UVs capable of retrieving or protecting the package (block 450). For example, the intelligence platform (e.g., intelligence platform 250, using computing resource 255, processor 320, memory 330, storage component 340, input component 350, communication interface 370, and/or the like) may receive vehicular data associated with a plurality of UVs capable of retrieving or protecting the package, as described above in connection with FIGS. 1A-1F.

As further shown in FIG. 4, process 400 may include determining a second score for one or more of the plurality of UVs, wherein the second score predicts a measure of confidence that a first UV, of the one or more of the plurality of UVs, is capable of retrieving or protecting the package (block 460). For example, the intelligence platform (e.g., intelligence platform 250, using computing resource 255, processor 320, memory 330, storage component 340, and/or the like) may determine a second score for one or more of the plurality of UVs, as described above in connection with FIGS. 1A-1F. In some implementations, the second score predicts a measure of confidence that a first UV, of the one or more of the plurality of UVs, is capable of retrieving or protecting the package.

As further shown in FIG. 4, process 400 may include selecting the first UV, of the one or more of the plurality of UVs, to retrieve or protect the package based on the second score (block 470). For example, the intelligence platform (e.g., intelligence platform 250, using computing resource 255, processor 320, memory 330, storage component 340, and/or the like) may select the first UV, of the one or more of the plurality of UVs, to retrieve or protect the package based on the second score, as described above in connection with FIGS. 1A-1F.

As further shown in FIG. 4, process 400 may include determining instructions for causing the first UV to navigate to the package and retrieve or protect the package (block 480). For example, the intelligence platform (e.g., intelligence platform 250, using computing resource 255, processor 320, memory 330, storage component 340, and/or the like) may determine instructions for causing the first UV to navigate to the package and retrieve or protect the package, as described above in connection with FIGS. 1A-1F.

As further shown in FIG. 4, process 400 may include transmitting the instructions to the first UV to cause the first UV to navigate to the package and retrieve or protect the package (block 490). For example, the intelligence platform (e.g., intelligence platform 250, using computing resource 255, processor 320, memory 330, storage component 340, output component 360, communication interface 370, and/or the like) may transmit instructions for causing the first UV to navigate to the package and retrieve or protect the package, as described above in connection with FIGS. 1A-1F.

Process 400 may include additional implementations, such as any single implementation or any combination of implementations described below and/or in connection with one or more other processes described elsewhere herein.

In some implementations, the sensor data may include data associated with an external temperature or humidity outside of the package, data associated with an internal temperature or humidity inside of the package, data associated with a spatial position of the package, data associated with a building disposed proximate to the package, data associated with a person disposed proximate to the package, and/or data associated with an animal partially contained by the package. In some implementations, the third party data may include emergency data associated with the geographic region, weather data associated with the geographic region, and/or crime data associated with the geographic region. In some implementations, the vehicular data may include data indicating a location associated with a UV included in the plurality of UVs, data indicating a travel range associated with the UV included in the plurality of UVs, and/or data indicating traffic conditions associated with the UV included in the plurality of UVs.

In some implementations, the intelligence platform may cause the first UV to redeliver the package to a sender of the package or an alternative location. In some implementations, the instructions may be configured to cause the first UV to record audio data associated with the package, record video data associated with the package, capture image data associated with the package, or contact one or more first responders based on the instructions. In some implementations, the instructions may be configured to cause the first UV to deploy an item to protect or retrieve the package based on the instructions. In some implementations, the item may include a net, a rope, a hook, a magnet, an umbrella, a mask, a tool, an inflatable device, a lighting device, food, water, and/or medicine.

In some implementations, the intelligence platform may determine that the first UV is no longer capable of retrieving or protecting the package, and may transmit instructions to a second UV to cause the second UV to navigate to the package and retrieve or protect the package based on determining that the first UV is no longer capable of retrieving or protecting the package. In some implementations, the instructions to the second UV may be transmitted by a computing resource of the cloud computing environment or the first UV.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
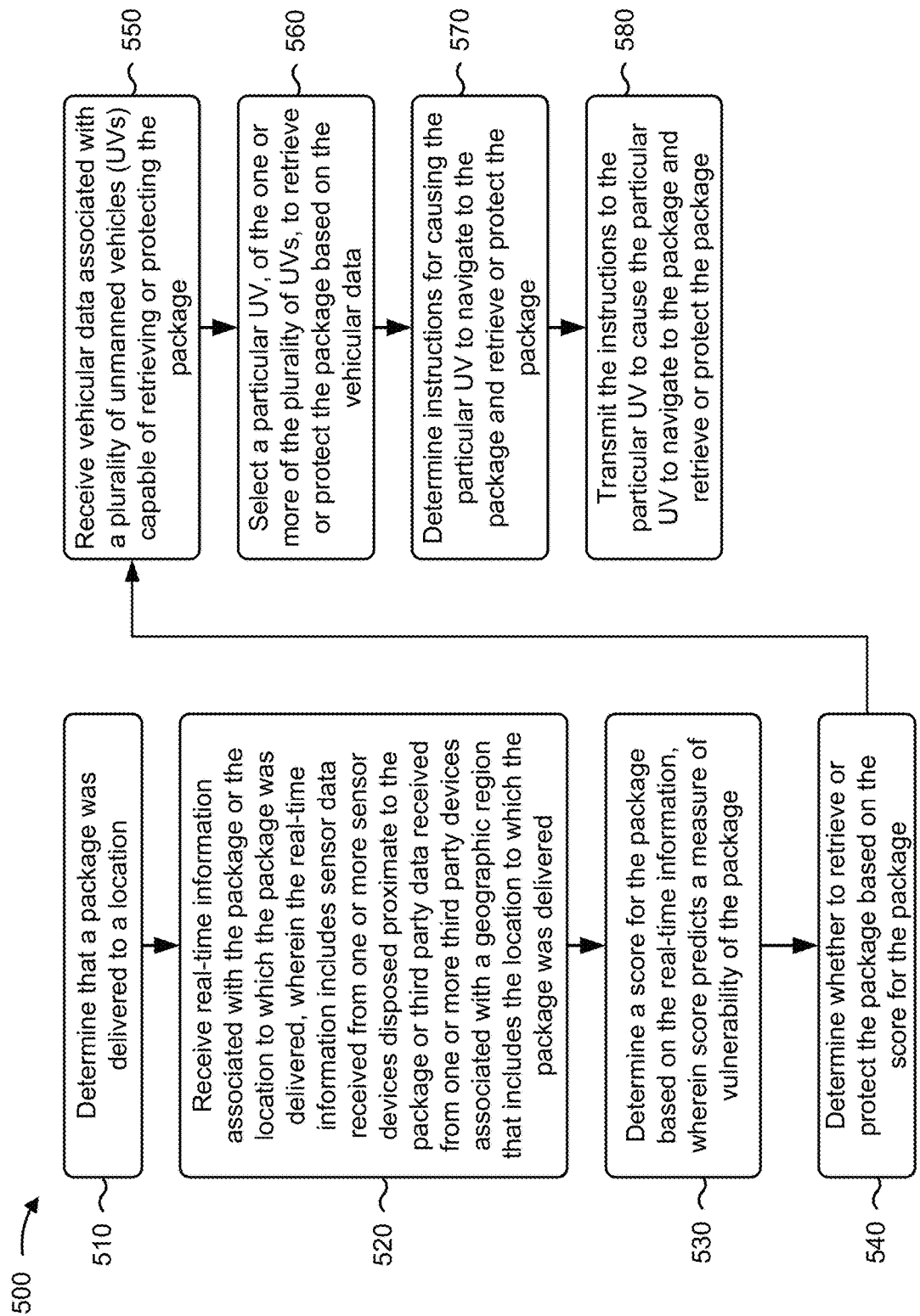
FIG. 5 is a flow chart of an example process for determining whether to retrieve or protect a delivered package using a UV.

FIG. 5 is a flow chart of an example process 500 for determining whether to retrieve or protect a delivered package using a UV. In some implementations, one or more process blocks of FIG. 5 may be performed by an intelligence platform (e.g., intelligence platform 250). In some implementations, one or more process blocks of FIG. 5 may be performed by another device or a group of devices separate from or including the intelligence platform, such as a sensor device (e.g., sensor device 210), a third party device (e.g., third party device 220), a UV device (e.g., UV device 230), and a computing resource (e.g., computing resource 255).

As shown in FIG. 5, process 500 may include determining that a package was delivered to a location (block 510). For example, the intelligence platform (e.g., intelligence platform 250, using computing resource 255, processor 320, memory 330, storage component 340, input component 350, output component 360, communication interface 370, and/or the like) may determine that a package was delivered to a location, as described above in connection with FIGS. 1A-1F.

As further shown in FIG. 5, process 500 may include receiving real-time information associated with the package or the location to which the package was delivered, wherein the real-time information includes sensor data received from one or more sensor devices disposed proximate to the package or third party data received from one or more third party devices associated with a geographic region that includes the location to which the package was delivered (block 520). For example, the intelligence platform (e.g., intelligence platform 250, using computing resource 255, processor 320, memory 330, storage component 340, input component 350, communication interface 370, and/or the like) may receive real-time information associated with the package or the location to which the package was delivered, as described above in connection with FIGS. 1A-1F. In some implementations, the real-time information includes sensor data received from one or more sensor devices disposed proximate to the package or third party data received from one or more third party devices associated with a geographic region that includes the location to which the package was delivered, as described above in connection with FIGS. 1A-1F.

As further shown in FIG. 5, process 500 may include determining a score for the package based on the real-time information, wherein score predicts a measure of vulnerability of the package (block 530). For example, the intelligence platform (e.g., using computing resource 255, processor 320, memory 330, storage component 340, and/or the like) may determine a score for the package based on the real-time information, wherein score predicts a measure of vulnerability of the package, as described above in connection with FIGS. 1A-1F.

As further shown in FIG. 5, process 500 may include determining whether to retrieve or protect the package based on the score for the package (block 540). For example, the intelligence platform (e.g., intelligence platform 250, using computing resource 255, processor 320, memory 330, storage component 340, and/or the like) may determine whether to retrieve or protect the package based on the score for the package, as described above in connection with FIGS. 1A-1F.

As further shown in FIG. 5, process 500 may include receiving vehicular data associated with a plurality of unmanned vehicles UVs capable of retrieving or protecting the package (block 550). For example, the intelligence platform (e.g., intelligence platform 250, using computing resource 255, processor 320, memory 330, storage component 340, input component 350, communication interface 370, and/or the like) may receive vehicular data associated with a plurality of UVs capable of retrieving or protecting the package, as described above in connection with FIGS. 1A-1F.

As further shown in FIG. 5, process 500 may include selecting a particular UV, of the one or more of the plurality of UVs, to retrieve or protect the package based on the vehicular data (block 560). For example, the intelligence platform (e.g., intelligence platform 250, using computing resource 255, processor 320, memory 330, storage component 340, and/or the like) may select a particular UV, of the one or more of the plurality of UVs, to retrieve or protect the package based on the vehicular data, as described above in connection with FIGS. 1A-1F.

As further shown in FIG. 5, process 500 may include determining instructions for causing the particular UV to navigate to the package and retrieve or protect the package (block 570). For example, the intelligence platform (e.g., intelligence platform 250, using computing resource 255, processor 320, memory 330, storage component 340, and/or the like) may determine instructions for causing the particular UV to navigate to the package and retrieve or protect the package, as described above in connection with FIGS. 1A-1F.

As further shown in FIG. 5, process 500 may include transmitting the instructions to the first UV to cause the particular UV to navigate to the package and retrieve or protect the package (block 580). For example, the intelligence platform (e.g., intelligence platform 250, using computing resource 255, processor 320, memory 330, storage component 340, output component 360, communication interface 370, and/or the like) may transmit the instructions to the particular UV to cause the fir particular UV to navigate to the package and retrieve or protect the package, as described above in connection with FIGS. 1A-1F.

Process 500 may include additional implementations, such as any single implementation or any combination of implementations described below and/or in connection with one or more other processes described elsewhere herein.

In some implementations, the package may include a credit card, a debit card, cash, a check, or a cashier's check. In some implementations, the package may include an animal or food, and the sensor data may be associated with a health or safety of the animal or the food. In some implementations, at least one wall of the package may include a magnet, and the instructions may be configured to cause the particular UV to deploy a magnetic member to retrieve the package using the magnet.

In some implementations, the sensor data may include data associated with an external temperature or humidity outside of the package, data associated with an internal temperature or humidity inside of the package, data associated with a spatial position of the package, data associated with a building disposed proximate to the package, data associated with a person disposed proximate to the package, and/or data associated with an animal partially contained by the package.

In some implementations, the data associated with the person may include biometric information, pulmonary information, or respiratory information. In some implementations, the third party data may include emergency data associated with the geographic region, weather data associated with the geographic region, and/or crime data associated with the geographic region.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
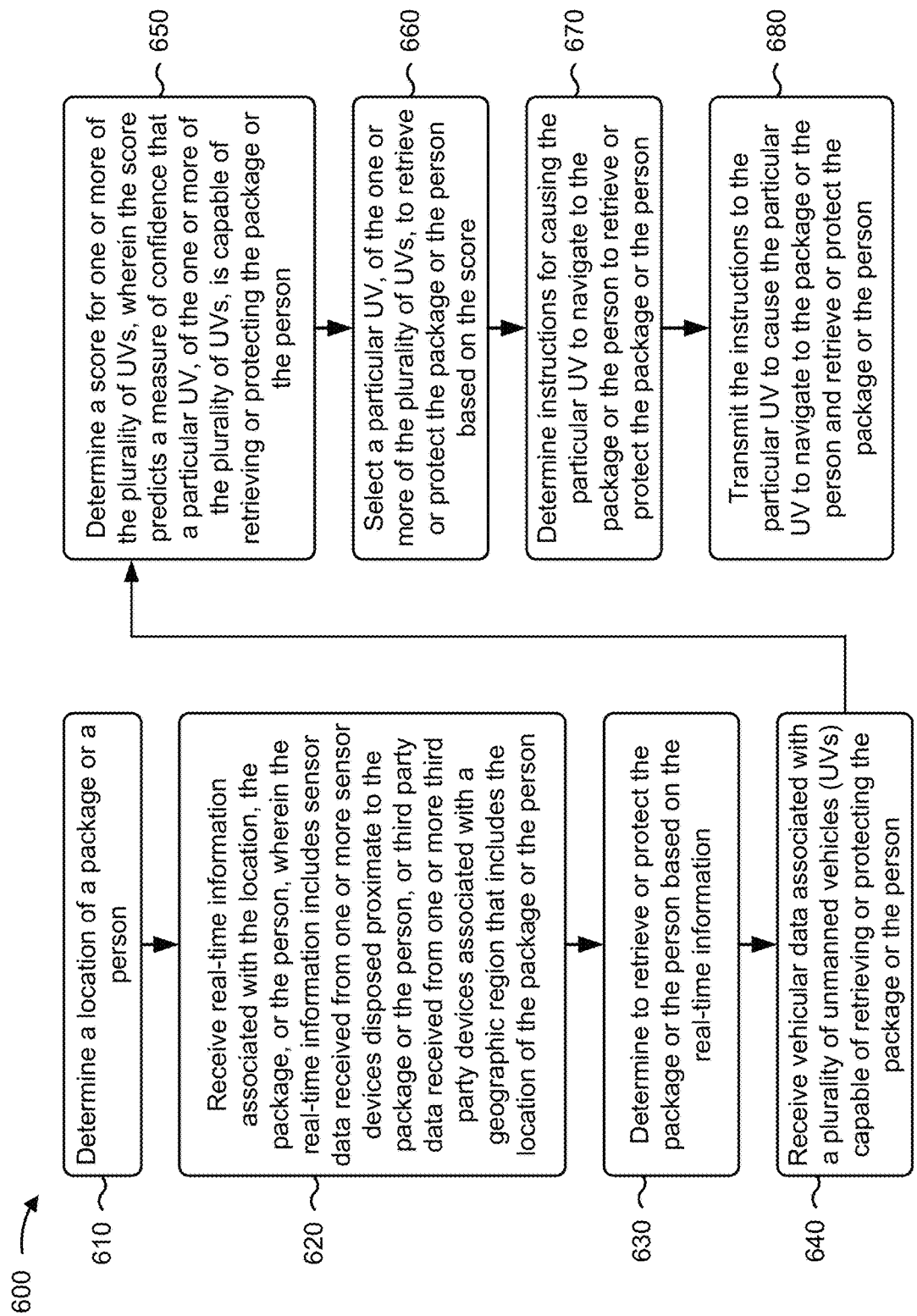
FIG. 6 is a flow chart of an example process for determining whether to retrieve or protect a delivered package or a person using a UV.

FIG. 6 is a flow chart of an example process 600 for determining whether to retrieve or protect a delivered package or a person using a UV. In some implementations, one or more process blocks of FIG. 6 may be performed by an intelligence platform (e.g., intelligence platform 250). In some implementations, one or more process blocks of FIG. 5 may be performed by another device or a group of devices separate from or including the intelligence platform, such as a sensor device (e.g., sensor device 210), a third party device (e.g., third party device 220), a UV device (e.g., UV device 230), and a computing resource (e.g., computing resource 255).

As shown in FIG. 6, process 600 may include determining a location of a package or a person (block 610). For example, the intelligence platform (e.g., intelligence platform 250, using computing resource 255, processor 320, memory 330, storage component 340, input component 350, output component 360, communication interface 370, and/or the like) may determine a location of a package or a person, as described above in connection with FIGS. 1A-1F.

As further shown in FIG. 6, process 600 may include receiving real-time information associated with the location, the package, or the person, wherein the real-time information includes sensor data received from one or more sensor devices disposed proximate to the package or the person, or third party data received from one or more third party devices associated with a geographic region that includes the package or the person (block 620). For example, the intelligence platform (e.g., intelligence platform 250, using computing resource 255, processor 320, memory 330, storage component 340, input component 350, communication interface 370, and/or the like) may receive real-time information associated with the location, the package, or the person, as described above in connection with FIGS. 1A-1F. In some implementations, the real-time information includes sensor data received from one or more sensor devices disposed proximate to the package or the person, or third party data received from one or more third party devices associated with a geographic region that includes the location of the package or the person.

As further shown in FIG. 6, process 600 may include determining to retrieve or protect the package or the person based on the real-time information (block 630). For example, the intelligence platform (e.g., intelligence platform 250, using computing resource 255, processor 320, memory 330, storage component 340, and/or the like) may determine to retrieve or protect the package or the person based on the real-time information, as described above in connection with FIGS. 1A-1F.

As further shown in FIG. 6, process 600 may include receiving vehicular data associated with a plurality of UVs capable of retrieving or protecting the package or the person (block 640). For example, the intelligence platform (e.g., intelligence platform 250, using computing resource 255, processor 320, memory 330, storage component 340, input component 350, communication interface 370, and/or the like) may receive vehicular data associated with a plurality of UVs capable of retrieving or protecting the package or the person, as described above in connection with FIGS. 1A-1F.

As further shown in FIG. 6, process 600 may include determining a score for one or more of the plurality of UVs, wherein the score predicts a measure of confidence that a particular UV, of the one or more of the plurality of UVs, is capable of retrieving or protecting the package or the person (block 650). For example, the intelligence platform (e.g., intelligence platform 250, using computing resource 255, processor 320, memory 330, storage component 340, and/or the like) may determine a score for one or more of the plurality of UVs, as described above in connection with FIGS. 1A-1F. In some implementations, the score predicts a measure of confidence that a particular UV, of the one or more of the plurality of UVs, is capable of retrieving or protecting the package or the person.

As further shown in FIG. 6, process 600 may include selecting a particular UV, of the one or more of the plurality of UVs, to retrieve or protect the package or the person based on the score (block 660). For example, the intelligence platform (e.g., intelligence platform 250, using computing resource 255, processor 320, memory 330, storage component 340, and/or the like) may select a particular UV, of the one or more of the plurality of UVs, to retrieve or protect the package based on the score, as described above in connection with FIGS. 1A-1F.

As further shown in FIG. 6, process 600 may include determining instructions for causing the particular UV to navigate to the package or the person to retrieve or protect the package or the person (block 670). For example, the intelligence platform (e.g., intelligence platform 250, using computing resource 255, processor 320, memory 330, storage component 340, and/or the like) may determine instructions for causing the particular UV to navigate to the package or the person to retrieve or protect the package or the person, as described above in connection with FIGS. 1A-1F.

As further shown in FIG. 6, process 600 may include transmitting the instructions to the particular UV to cause the particular UV to navigate to the package or the person and retrieve or protect the package or the person (block 680). For example, the intelligence platform (e.g., intelligence platform 250, using computing resource 255, processor 320, memory 330, storage component 340, output component 360, communication interface 370, and/or the like) may transmit the instructions to the particular UV to cause the particular UV to navigate to the package or the person and retrieve or protect the package or the person, as described above in connection with FIGS. 1A-1F.

Process 600 may include additional implementations, such as any single implementation or any combination of implementations described below and/or in connection with one or more other processes described elsewhere herein.

In some implementations, the intelligence platform may receive real-time health data associated with the person, and may transmit the instructions to the particular UV to protect the person based on the real-time health data. In some implementations, the instructions may be configured to cause the particular UV to deploy food, water, medicine, a medical device, an umbrella, a mask, a lighting device, or a protective device to protect the person.

In some implementations, the intelligence platform may receive real-time spatial location data associated with the package, determine that the package is moving, and transmit the instructions to the particular UV to protect the package based on the real-time spatial location data. In some implementations, the instructions may be configured to cause the particular UV to record video data associated with movement of the package. In some implementations, the intelligence platform may receive real-time safety data associated with a food contained by the package, and transmit the instructions to the particular UV to retrieve the package based on the real-time safety data.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, intelligence platform 250 reduces or obviates the need for computing resources devoted to duplicating (i.e., re-doing) orders and/or delivery for lost, stolen, or damaged packages. The intelligent package retrieval and/or protection methods described herein may prevent fraud, waste, and/or millions of dollars in losses of consumer products per year. Intelligence platform 250 may capable of receiving, analyzing, and/or monitoring real-time information associated with a person or a location associated with the person, and determine whether to retrieve or protect the person based on the real-time information. In this way, resources that may otherwise be devoted to assisting and/or rescuing the person may be reduced or obviated.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to refer to "based, at least in part, on" unless explicitly stated otherwise.

What is claimed is:
1. A method, comprising:
 determining, by a device, a location of a package or a person;
 receiving, by the device, real-time information associated with at least one of the location of the package, the package, or the person,
  wherein the real-time information includes:
   sensor data received from one or more sensor devices disposed proximate to the package or the person, or third party data received from one or more third party devices associated with a geographic region that includes the location of the package or the person;
determining, by the device, to protect the package or the person based on the real-time information;
receiving, by the device, vehicular data associated with a plurality of unmanned vehicles (UVs) capable of protecting the package or the person;
determining, by the device and using a machine learning model, a score for one or more of the plurality of UVs, wherein the score predicts a measure of confidence that a particular UV, of the one or more of the plurality of UVs, is capable of protecting the package or the person;
selecting, by the device, the particular UV, of the one or more of the plurality of UVs, to protect the package or the person based on the score;
determining, by the device, instructions for causing the particular UV to navigate to the package or the person and protect the package or the person; and
causing, by the device and by transmitting the instructions to the particular UV, the particular UV to navigate to the package or the person and protect the package or the person.

2. The method of claim 1, further comprising:
receiving real-time health data associated with the person; and
transmitting the instructions to the particular UV to protect the person based on the real-time health data,
wherein the instructions are configured to cause the particular UV to deploy food, water, medicine, a medical device, an umbrella, a mask, a lighting device, or a protective device to protect the person.

3. The method of claim 1, further comprising:
receiving real-time spatial location data associated with the package;
determining that the package is moving; and
transmitting the instructions to the particular UV to protect the package based on the real-time spatial location data,
wherein the instructions are configured to cause the particular UV to record video data associated with movement of the package.

4. The method of claim 1, further comprising:
receiving real-time safety data associated with a food contained by the package; and
transmitting the instructions to the particular UV to protect the package based on the real-time safety data.

5. The method of claim 1, further comprising:
determining that the particular UV is no longer capable of protecting the package or the person; and
transmitting other instructions to another UV, of the plurality of UVs, to cause the other UV to navigate to the package or the person and protect the package or the person based on determining that the particular UV is no longer capable of protecting the package or the person.

6. The method of claim 1, wherein the sensor data includes at least one of:
data indicating a measure of temperature,
data including a measure of humidity,
data indicating a spatial position, or
data obtained from a camera proximate to the package or the person.

7. The method of claim 1, wherein the third party data includes at least one of:
emergency data associated with the geographic region, weather data associated with the geographic region, or crime data associated with the geographic region.

8. A device, comprising:
one or more memories; and
one or more processors, communicatively coupled to the one or more memories, to:
determine a location of a package or a person;
receive real-time information associated with at least one of the location of the package, the package, or the person,
wherein the real-time information includes:
sensor data received from one or more sensor devices disposed proximate to the package or the person, or
third party data received from one or more third party devices associated with a geographic region that includes the location of the package or the person;
determine to protect the package or the person based on the real-time information;
receive vehicular data associated with a plurality of unmanned vehicles (UVs) capable of protecting the package or the person;
determine, using a machine learning model, a score for one or more of the plurality of UVs,
wherein the score predicts a measure of confidence that a particular UV, of the one or more of the plurality of UVs, is capable of protecting the package or the person;
select the particular UV, of the one or more of the plurality of UVs, to protect the package or the person based on the score;
determine instructions for causing the particular UV to navigate to the package or the person and protect the package or the person; and
cause, by transmitting the instructions to the particular UV, the particular UV to navigate to the package or the person and protect the package or the person.

9. The device of claim 8, wherein the one or more processors are further to:
receive real-time health data associated with the person; and
transmit the instructions to the particular UV to protect the person based on the real-time health data,
wherein the instructions are configured to cause the particular UV to deploy food, water, medicine, a medical device, an umbrella, a mask, a lighting device, or a protective device to protect the person.

10. The device of claim 8, wherein the one or more processors are further to:
receive real-time spatial location data associated with the package;
determine that the package is moving; and
transmit the instructions to the particular UV to protect the package based on the real-time spatial location data,
wherein the instructions are configured to cause the particular UV to record video data associated with movement of the package.

11. The device of claim 8, wherein the one or more processors are further to:
receive real-time safety data associated with a food contained by the package; and
transmit the instructions to the particular UV to protect the package based on the real-time safety data.

12. The device of claim 8, wherein the one or more processors are further to:

determine that the particular UV is no longer capable of protecting the package or the person; and transmit other instructions to another UV, of the plurality of UVs, to cause the other UV to navigate to the package or the person and protect the package or the person based on determining that the particular UV is no longer capable of protecting the package or the person.

13. The device of claim 8, wherein the sensor data includes at least one of:
   data indicating a measure of temperature,
   data including a measure of humidity,
   data indicating a spatial position, or
   data obtained from a camera proximate to the package or the person.

14. The device of claim 8, wherein the third party data includes at least one of:
   emergency data associated with the geographic region,
   weather data associated with the geographic region, or
   crime data associated with the geographic region.

15. A non-transitory computer-readable medium storing instructions, the instructions comprising:
   one or more instructions that, when executed by one or more processors, cause the one or more processors to:
      determine a location of a package or a person;
      receive real-time information associated with at least one of the location of the package, the package, or the person,
         wherein the real-time information includes:
            sensor data received from one or more sensor devices disposed proximate to the package or the person, or
            third party data received from one or more third party devices associated with a geographic region that includes the location of the package or the person;
      determine to protect the package or the person based on the real-time information;
      receive vehicular data associated with a plurality of unmanned vehicles (UVs) capable of protecting the package or the person;
      determine, using a machine learning model, a score for one or more of the plurality of UVs,
         wherein the score predicts a measure of confidence that a particular UV, of the one or more of the plurality of UVs, is capable of protecting the package or the person;
      select the particular UV, of the one or more of the plurality of UVs, to protect the package or the person based on the score;
      determine instructions for causing the particular UV to navigate to the package or the person and protect the package or the person; and
      cause, by transmitting the instructions to the particular UV, the particular UV to navigate to the package or the person and protect the package or the person.

16. The non-transitory computer-readable medium of claim 15, wherein the one or more instructions, when executed by the one or more processors, further cause the one or more processors to:
   receive real-time health data associated with the person; and
   transmit the instructions to the particular UV to protect the person based on the real-time health data,
      wherein the instructions are configured to cause the particular UV to deploy food, water, medicine, a medical device, an umbrella, a mask, a lighting device, or a protective device to protect the person.

17. The non-transitory computer-readable medium of claim 15, wherein the one or more instructions, when executed by the one or more processors, further cause the one or more processors to:
   receive real-time spatial location data associated with the package;
   determine that the package is moving; and
   transmit the instructions to the particular UV to protect the package based on the real-time spatial location data,
      wherein the instructions are configured to cause the particular UV to record video data associated with movement of the package.

18. The non-transitory computer-readable medium of claim 15, wherein the one or more instructions, when executed by the one or more processors, further cause the one or more processors to:
   receive real-time safety data associated with a food contained by the package; and
   transmit the instructions to the particular UV to protect the package based on the real-time safety data.

19. The non-transitory computer-readable medium of claim 15, wherein the one or more instructions, when executed by the one or more processors, further cause the one or more processors to:
   determine that the particular UV is no longer capable of protecting the package or the person; and
   transmit other instructions to another UV, of the plurality of UVs, to cause the other UV to navigate to the package or the person and protect the package or the person based on determining that the particular UV is no longer capable of protecting the package or the person.

20. The non-transitory computer-readable medium of claim 15, wherein the sensor data includes at least one of:
   data indicating a measure of temperature,
   data including a measure of humidity,
   data indicating a spatial position, or
   data obtained from a camera proximate to the package or the person.

* * * * *